US012382229B2

(12) United States Patent
Qi et al.

(10) Patent No.: US 12,382,229 B2
(45) **Date of Patent: *Aug. 5, 2025**

(54) SYSTEMS AND METHODS FOR SUPPRESSING SOUND LEAKAGE

(71) Applicant: SHENZHEN SHOKZ CO., LTD., Guangdong (CN)

(72) Inventors: Xin Qi, Shenzhen (CN); Fengyun Liao, Shenzhen (CN); Lei Zhang, Shenzhen (CN); Junjiang Fu, Shenzhen (CN); Bingyan Yan, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 199 days.

This patent is subject to a terminal disclaimer.

(21) Appl. No.: 18/151,447

(22) Filed: Jan. 8, 2023

(65) Prior Publication Data

US 2023/0164497 A1 May 25, 2023

Related U.S. Application Data

(63) Continuation of application No. 17/171,180, filed on Feb. 9, 2021, now Pat. No. 11,582,563, which is a (Continued)

(30) Foreign Application Priority Data

Jan. 6, 2014 (CN) ......................... 201410005804.0
Apr. 30, 2019 (CN) ......................... 201910364346.2

(Continued)

(51) Int. Cl.
*H04R 1/28* (2006.01)
*G10K 9/13* (2006.01)

(Continued)

(52) U.S. Cl.
CPC ............ *H04R 25/505* (2013.01); *G10K 9/13* (2013.01); *G10K 9/22* (2013.01); *G10K 11/175* (2013.01);

(Continued)

(58) Field of Classification Search
CPC .. G10K 11/175; G10K 11/178; H04R 1/2811; H04R 2460/13

(Continued)

(56) References Cited

U.S. PATENT DOCUMENTS 2,327,320 A 8/1943 Shapiro
4,987,597 A 1/1991 Haertl (Continued)

FOREIGN PATENT DOCUMENTS

CN 201616895 U 10/2010
CN 201690580 U 12/2010

(Continued)

OTHER PUBLICATIONS

Translation of Chinese Patent Publication CN109547888, Li et al., Mar. 29, 2019 (Year: 2019).*

(Continued)

*Primary Examiner* — Katherine A Faley
(74) *Attorney, Agent, or Firm* — Metis IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in a target region. The interference at a specific frequency (Continued)

relates to a distance between the at least one sound guiding hole and the portion of the housing.

18 Claims, 21 Drawing Sheets

Related U.S. Application Data continuation-in-part of application No. 17/074,762, filed on Oct. 20, 2020, now Pat. No. 11,197,106, and a continuation-in-part of application No. PCT/CN2020/088482, filed on Apr. 30, 2020, said application No. 17/074,762 is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978.

(30) Foreign Application Priority Data

Sep. 19, 2019 (CN) ......................... 201910888067.6
Sep. 19, 2019 (CN) ......................... 201910888762.2

(51) Int. Cl.

| | |
|---|---|
| ***G10K 9/22*** | (2006.01) |
| ***G10K 11/175*** | (2006.01) |
| ***G10K 11/178*** | (2006.01) |
| ***G10K 11/26*** | (2006.01) |
| ***H04R 9/06*** | (2006.01) |
| ***H04R 25/00*** | (2006.01) |
| *H04R 17/00* | (2006.01) |

(52) U.S. Cl.
CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(58) Field of Classification Search
USPC .......................................................... 381/151
See application file for complete search history.

(56) References Cited

U.S. PATENT DOCUMENTS

| | | | | |
|---|---|---|---|---|
| 5,430,803 | A | 7/1995 | Kimura et al. | |
| 5,692,059 | A | 11/1997 | Kruger | |
| 5,757,935 | A | 5/1998 | Kang et al. | |
| 5,790,684 | A | 8/1998 | Niino et al. | |
| 6,850,138 | B1 | 2/2005 | Sakai | |
| 8,141,678 | B2 | 3/2012 | Ikeyama et al. | |
| 9,226,075 | B2 | 12/2015 | Lee | |
| 9,729,978 | B2 | 8/2017 | Qi et al. | |
| 10,506,362 | B1 | 12/2019 | Gomes | |
| 10,631,075 | B1 | 4/2020 | Patil et al. | |
| 10,897,677 | B2 | 1/2021 | Walraevens et al. | |
| 11,197,106 | B2 * | 12/2021 | Qi | H04R 1/288 |
| 11,582,563 | B2 * | 2/2023 | Qi | H04R 9/066 |
| 2003/0048913 | A1 | 3/2003 | Lee et al. | |
| 2004/0131219 | A1 | 7/2004 | Polk, Jr. | |
| 2005/0251952 | A1 | 11/2005 | Johnson | |
| 2006/0094481 | A1 | 5/2006 | Gullickson | |
| 2006/0098829 | A1 | 5/2006 | Kobayashi | |
| 2007/0034493 | A1 * | 2/2007 | Kawasaki | H04M 1/18 200/302.2 |
| 2007/0041595 | A1 | 2/2007 | Carazo et al. | |
| 2007/0237341 | A1 | 10/2007 | Laroche | |
| 2007/0274556 | A1 | 11/2007 | Matsumura et al. | |
| 2008/0144874 | A1 | 6/2008 | Wu et al. | |
| 2008/0287063 | A1 | 11/2008 | Kidron et al. | |
| 2009/0095613 | A1 | 4/2009 | Lin | |
| 2009/0141920 | A1 | 6/2009 | Suyama | |
| 2009/0147981 | A1 | 6/2009 | Blanchard et al. | |
| 2009/0190781 | A1 | 7/2009 | Fukuda | |
| 2009/0285417 | A1 | 11/2009 | Shin et al. | |
| 2009/0290730 | A1 | 11/2009 | Fukuda et al. | |
| 2009/0304209 | A1 | 12/2009 | Nakatani | |
| 2010/0054492 | A1 | 3/2010 | Eaton et al. | |
| 2010/0080400 | A1 | 4/2010 | Sibbald et al. | |
| 2010/0246864 | A1 | 9/2010 | Hildebrandt et al. | |
| 2010/0322454 | A1 | 12/2010 | Ambrose et al. | |
| 2011/0150262 | A1 | 6/2011 | Nakama et al. | |
| 2012/0020501 | A1 | 1/2012 | Lee | |
| 2012/0070022 | A1 | 3/2012 | Saiki | |
| 2012/0177206 | A1 | 7/2012 | Yamagishi et al. | |
| 2012/0201406 | A1 * | 8/2012 | Yamaguchi | H04R 1/1016 381/309 |
| 2013/0051585 | A1 | 2/2013 | Karkkainen et al. | |
| 2013/0266170 | A1 | 10/2013 | Yamagishi | |
| 2013/0329919 | A1 | 12/2013 | He | |
| 2014/0009008 | A1 | 1/2014 | Li et al. | |
| 2014/0064533 | A1 | 3/2014 | Kasic, II | |
| 2014/0185822 | A1 | 7/2014 | Kunimoto et al. | |
| 2014/0185837 | A1 | 7/2014 | Kunimoto et al. | |
| 2014/0226843 | A1 | 8/2014 | Pan | |
| 2014/0274229 | A1 | 9/2014 | Fukuda | |
| 2014/0294182 | A1 | 10/2014 | Axelsson et al. | |
| 2014/0315605 | A1 * | 10/2014 | Cho | H04M 1/035 455/575.1 |
| 2014/0321674 | A1 | 10/2014 | Abolfathe | |
| 2014/0355777 | A1 | 12/2014 | Nabata et al. | |
| 2015/0030189 | A1 | 1/2015 | Nabata et al. | |
| 2015/0256656 | A1 | 9/2015 | Horii | |
| 2015/0264473 | A1 | 9/2015 | Fukuda | |
| 2015/0268673 | A1 | 9/2015 | Farzbod et al. | |
| 2015/0326967 | A1 | 11/2015 | Otani | |
| 2016/0037243 | A1 | 2/2016 | Lippert et al. | |
| 2016/0037256 | A1 | 2/2016 | Katsuda et al. | |
| 2016/0050474 | A1 | 2/2016 | Rye et al. | |
| 2016/0150337 | A1 | 5/2016 | Nandy | |
| 2016/0165357 | A1 | 6/2016 | Morishita et al. | |
| 2016/0295328 | A1 | 10/2016 | Park | |
| 2016/0329041 | A1 * | 11/2016 | Qi | G10K 9/13 |
| 2017/0180878 | A1 | 6/2017 | Petersen et al. | |
| 2017/0201823 | A1 | 7/2017 | Shetye et al. | |
| 2017/0223445 | A1 | 8/2017 | Bullen et al. | |
| 2018/0167710 | A1 | 6/2018 | Silver et al. | |
| 2018/0182370 | A1 | 6/2018 | Hyde et al. | |
| 2018/0295449 | A1 | 10/2018 | Morgan et al. | |
| 2019/0052954 | A1 | 2/2019 | Rusconi Clerici Beltrami et al. | |
| 2019/0238971 | A1 | 8/2019 | Wakeland et al. | |
| 2019/0320258 | A1 | 10/2019 | Ohura | |
| 2020/0112783 | A1 | 4/2020 | Wakeland et al. | |
| 2020/0367008 | A1 | 11/2020 | Walsh et al. | |
| 2021/0014595 | A1 | 1/2021 | Li et al. | |
| 2021/0014602 | A1 | 1/2021 | Li et al. | |
| 2021/0099027 | A1 | 4/2021 | Larsson et al. | |
| 2021/0219043 | A1 | 7/2021 | Li et al. | |
| 2021/0219059 | A1 | 7/2021 | Qi et al. | |
| 2021/0219067 | A1 | 7/2021 | Zhang et al. | |
| 2021/0219073 | A1 | 7/2021 | Zhang et al. | |

FOREIGN PATENT DOCUMENTS

| | | | |
|---|---|---|---|
| CN | 102014328 | A | 4/2011 |
| CN | 102421043 | A | 4/2012 |
| CN | 202435600 | 0 | 9/2012 |
| CN | 103167390 | A | 6/2013 |
| CN | 103347235 | A | 10/2013 |
| CN | 204206450 | U | 3/2015 |

(56) References Cited

FOREIGN PATENT DOCUMENTS

| | | | | | |
|---|---|---|---|---|---|
| CN | 204948313 | U | | 1/2016 | |
| CN | 204948328 | U | | 1/2016 | |
| CN | 204948329 | U | | 1/2016 | |
| CN | 205336486 | U | | 6/2016 | |
| CN | 205754812 | U | | 11/2016 | |
| CN | 206865707 | U | | 1/2018 | |
| CN | 207070281 | U | | 3/2018 | |
| CN | 109547888 | A | * | 3/2019 | ........... H04R 1/1058 |
| CN | 109547905 | A | * | 3/2019 | ............. H04R 1/026 |
| EP | 2011367 | B1 | | 12/2014 | |
| JP | 2006332715 | A | | 12/2006 | |
| JP | 2007251358 | A | | 9/2007 | |
| JP | 2014072555 | A | | 4/2014 | |
| KR | 20050030183 | A | | 3/2005 | |
| KR | 20080103334 | A | | 11/2008 | |
| KR | 20090082999 | A | | 8/2009 | |
| WO | 02078393 | A2 | | 10/2002 | |
| WO | 2004095878 | A2 | | 11/2004 | |

OTHER PUBLICATIONS

International Search Report in PCT/CN2020/088482 mailed on Aug. 5, 2020, 4 pages.

Written Opinion in PCT/CN2020/088482 mailed on Aug. 5, 2020, 4 pages.

International Search Report in PCT/CN2014/094065 mailed on Mar. 17, 2015, 5 pages.

Written Opinion in PCT/CN2014/094065 mailed on Mar. 17, 2015, 10 pages.

First Office Action in Chinese application No. 201410005804.0 mailed on Dec. 17, 2015, 10 pages.

The Extended European Search Report in European Application No. 14877111.6 mailed on Mar. 17, 2017, 6 pages.

First Examination Report in Indian Application No. 201617026062 mailed on Nov. 13, 2020, 6 pages.

Notice of Reasons for Rejection in Japanese Application No. 2016-545828 mailed on Oct. 10, 2017, 6 pages.

Notice of Preliminary Rejection in Korean Application No. 10-2022-7010046 mailed on Jun. 20, 2022, 15 pages.

Decision to Grant a Patent in Japanese Application No. 2016-545828 mailed on Jan. 16, 2018, 5 pages.

* cited by examiner

SYSTEMS AND METHODS FOR SUPPRESSING SOUND LEAKAGE

CROSS-REFERENCE TO RELATED APPLICATIONS

The present application is a continuation of U.S. patent application Ser. No. 17/171,180 filed on Feb. 9, 2021, which is a continuation-in-part of U.S. patent application Ser. No. 17/074,762 (now U.S. Pat. No. 11,197,106) filed on Oct. 20, 2020, which is a continuation-in-part of U.S. patent application Ser. No. 16/813,915 (now U.S. Pat. No. 10,848,878) filed on Mar. 10, 2020, which is a continuation of U.S. patent application Ser. No. 16/419,049 (now U.S. Pat. No. 10,616,696) filed on May 22, 2019, which is a continuation of U.S. patent application Ser. No. 16/180,020 (now U.S. Pat. No. 10,334,372) filed on Nov. 5, 2018, which is a continuation of U.S. patent application Ser. No. 15/650,909 (now U.S. Pat. No. 10,149,071) filed on Jul. 16, 2017, which is a continuation of U.S. patent application Ser. No. 15/109,831 (now U.S. Pat. No. 9,729,978) filed on Jul. 6, 2016, which is a U.S. National Stage entry under 35 U.S.C. § 371 of International Application No. PCT/CN2014/094065, filed on Dec. 17, 2014, designating the United States of America, which claims priority to Chinese Patent Application No. 201410005804.0, filed on Jan. 6, 2014; U.S. patent application Ser. No. 17/171,180 is a continuation-in-part of International Application No. PCT/CN2020/088482, filed on Apr. 30, 2020, which claims priority to Chinese Patent Application No. 201910888067.6 filed on Sep. 19, 2019, Chinese Patent Application No. 201910888762.2 filed on Sep. 19, 2019, and Chinese Patent Application No. 201910364346.2 filed on Apr. 30, 2019. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including:

- providing a bone conduction speaker including a vibration board fitting human skin and passing vibrations, a transducer, and a housing, wherein at least one sound guiding hole is located in at least one portion of the housing;
- the transducer drives the vibration board to vibrate;
- the housing vibrates, along with the vibrations of the transducer, and pushes air, forming a leaked sound wave transmitted in the air;
- the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein:

the transducer is configured to generate vibrations and is located inside the housing;

the vibration board is configured to be in contact with skin and pass vibrations;

At least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
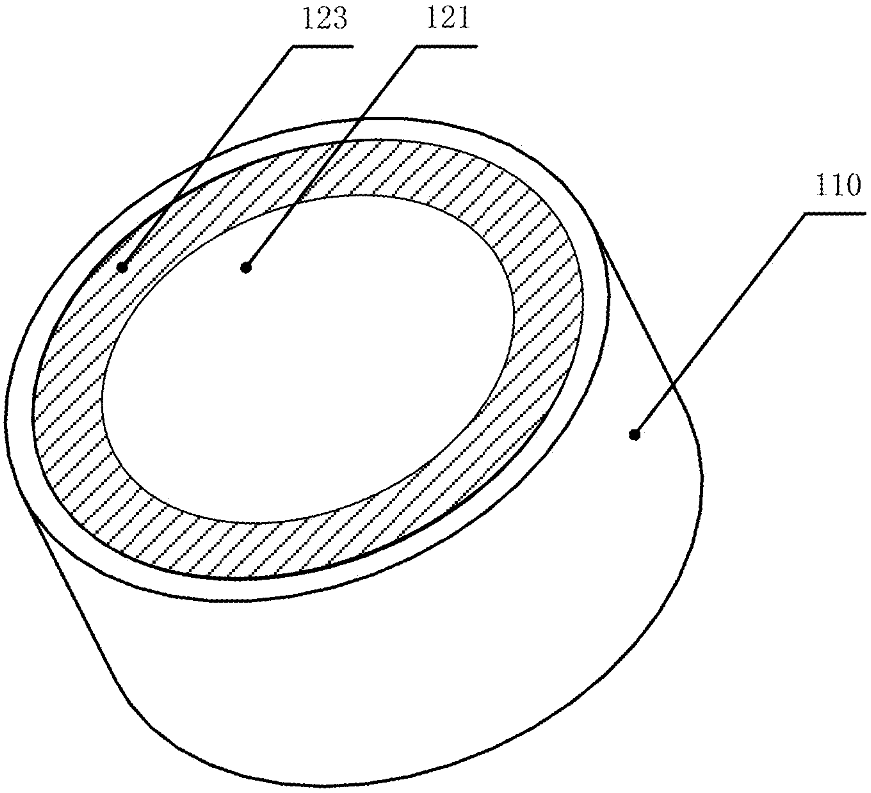
FIGS. 1A and 1B are schematic structures illustrating a bone conduction speaker of prior art.
Figure 1B:
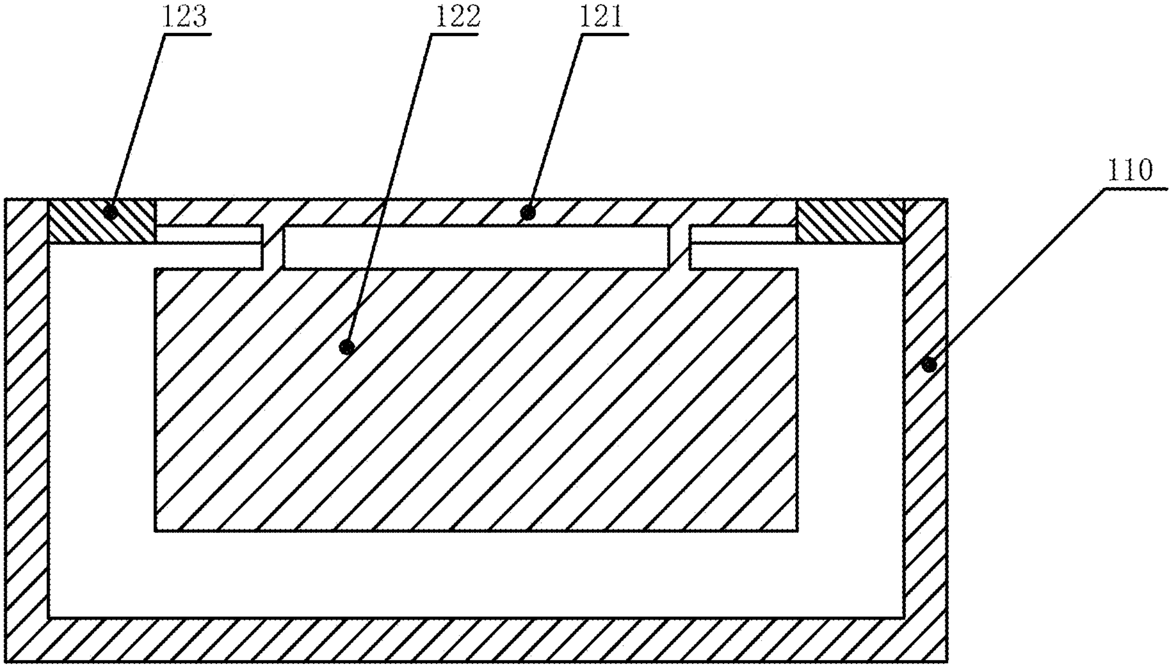
Figure 2:
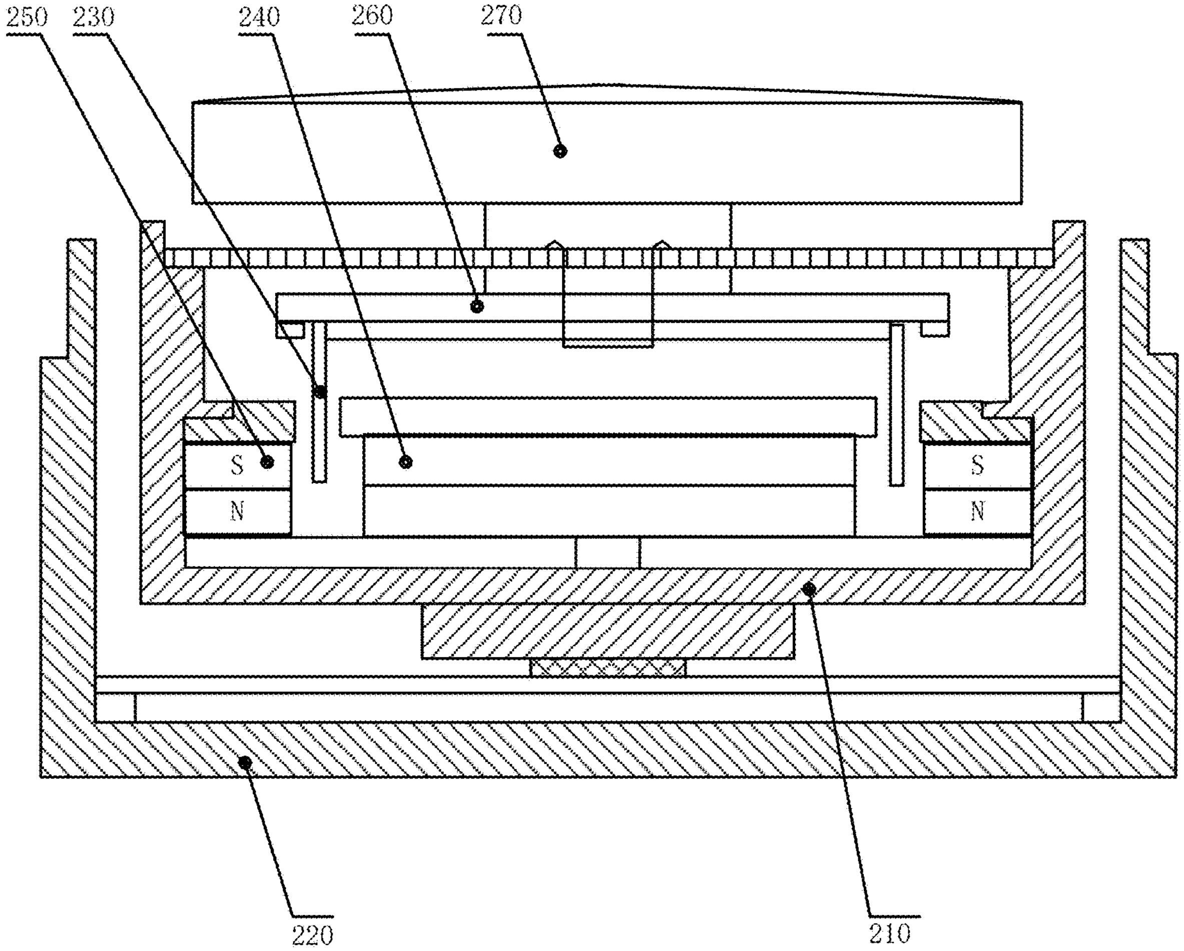
FIG. 2 is a schematic structure illustrating another bone conduction speaker of prior art.
Figure 3:
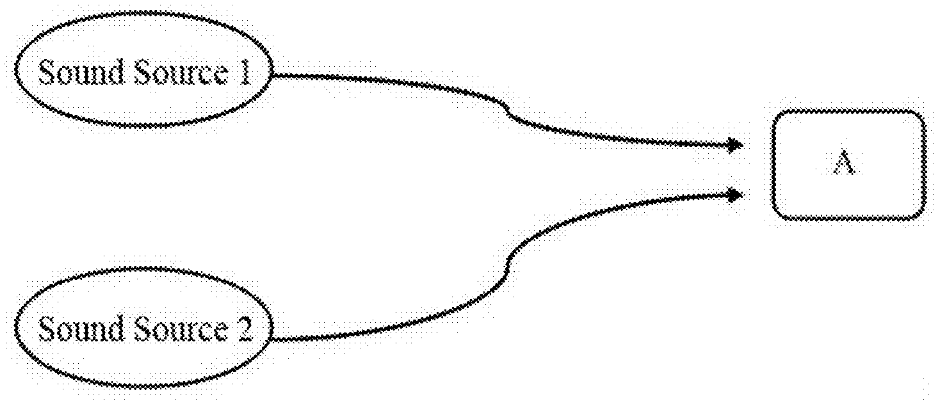
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
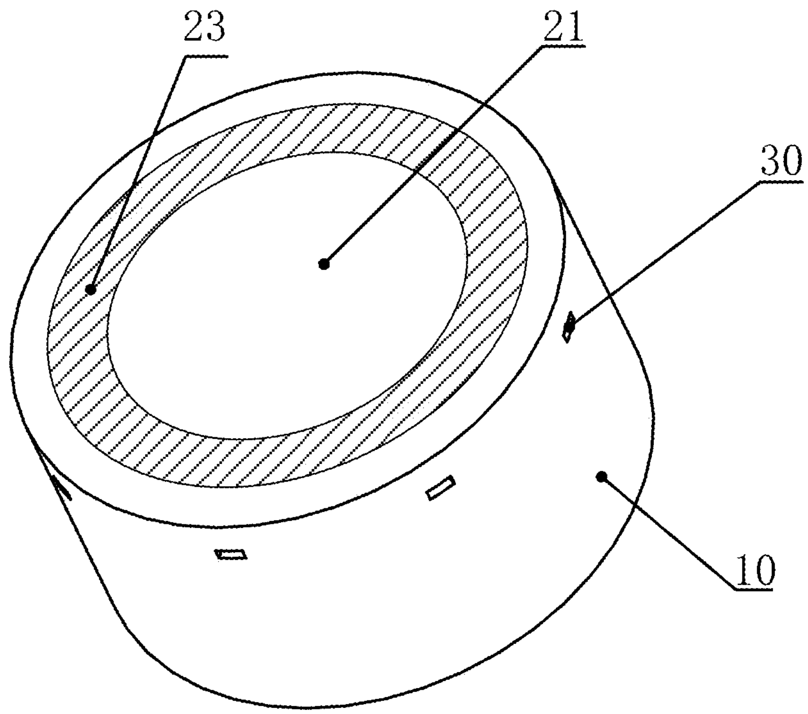
FIGS. 4A and 4B are schematic structures of an exemplary bone conduction speaker according to some embodiments of the present disclosure.
Figure 4B:
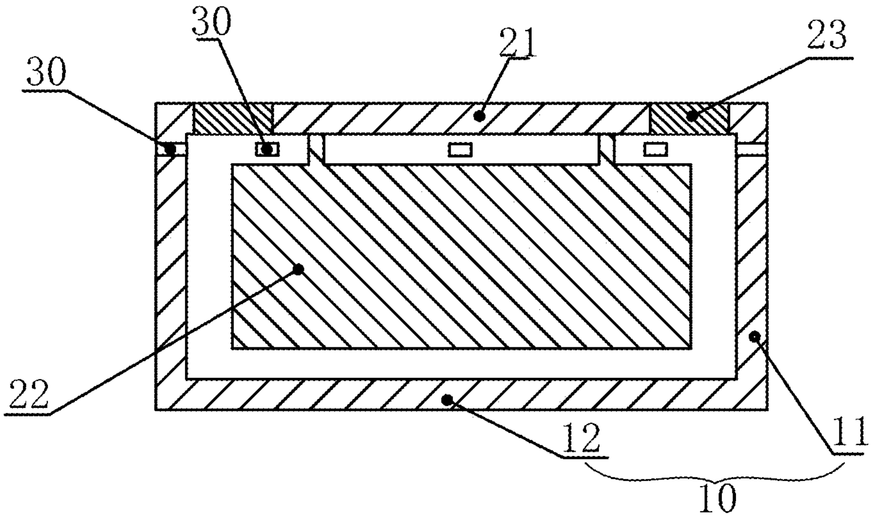

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
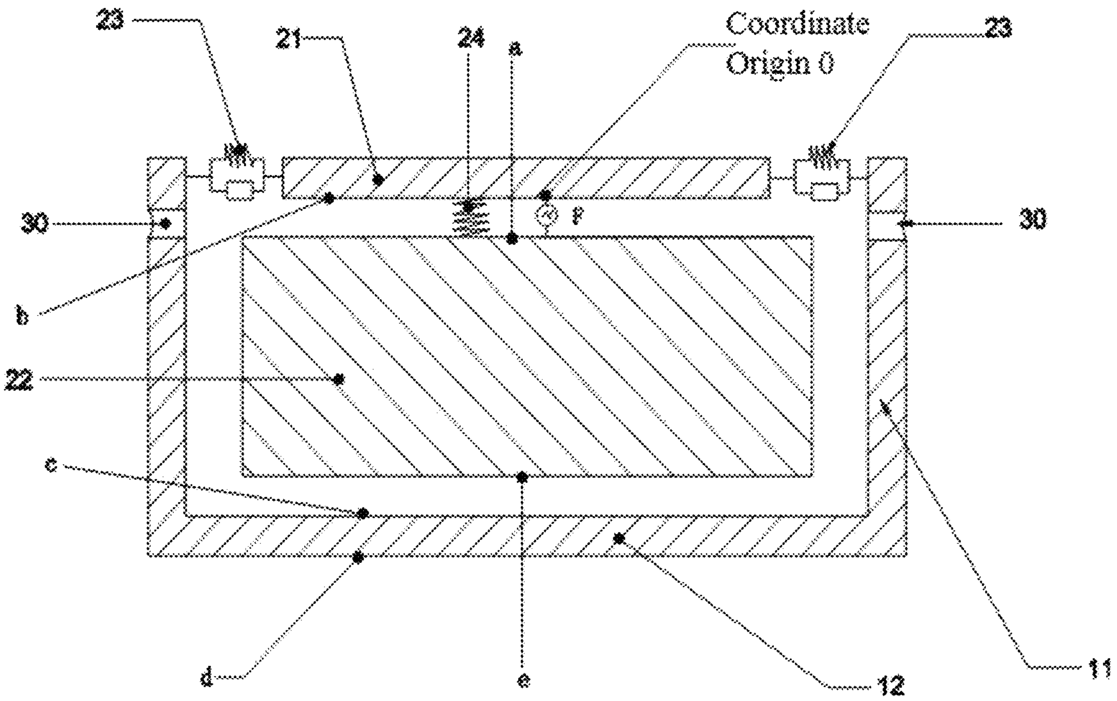
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$\left(\int_{S_{hole}} P ds - \iint_{S_{housing}} P_d ds\right), \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $$P = P_a + P_b + P_c + P_e, \tag{2}$$

wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x_a', y_a') \cdot \frac{e^{jkR}(x_a', y_a')}{4\pi R(x_a', y_a')} dx_a' dy_a' - P_{aR}, \tag{3}$$

$$P_b(x, y, z) = -j\omega\rho_0 \iint_{S_b} W_b(x', y') \cdot \frac{e^{jkR}(x', y')}{4\pi R(x', y')} dx' dy' - P_{bR}, \tag{4}$$

$$P_c(x, y, z) = -j\omega\rho_0 \iint_{S_c} W_c(x_c', y_c') \cdot \frac{e^{jkR}(x_c', y_c')}{4\pi R(x_c', y_c')} dx_c' dy_c' - P_{cR}, \tag{5}$$

$$P_e(x, y, z) = -j\omega\rho_0 \iint_{S_e} W_e(x_e', y_e') \cdot \frac{e^{jkR}(x_e', y_e')}{4\pi R(x_e', y_e')} dx_e' dy_e' - P_{eR}, \tag{6}$$

wherein $R(x',y')=\sqrt{(x-x')^2+(y-y')^2+z^2}$ is the distance between an observation point (x, y, z) and a point on side b (x', y', 0); $S_a$, $S_b$, $S_c$ and $S_e$ are the areas of side a, side b, side c and side e, respectively;

$R(x'_a, y'_a)=\sqrt{(x-x_a')^2+(y-y_a')^2+(z-z_a)^2}$ is the distance between the observation point (x, y, z) and a point on side a $(x'_a, y_a', z_a)$;

$R(x'_c, y'_c)=\sqrt{(x-x_c')^2+(y-y_c')^2+(z-z_c)^2}$ is the distance between the observation point (x, y, z) and a point on side c $(x'_c, y'_c, z_c)$;

$R(x'_e, y'_e)=\sqrt{(x-x_e')^2+(y-y_e')^2+(z-z_e)^2}$ is the distance between the observation point (x, y, z) and a point on side e $(x'_e, y'_e, z_e)$;

$k=\omega/u$ (u is the velocity of sound) is wave number, $\rho_0$ is an air density, $\omega$ is an angular frequency of vibration;

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a \cdot r'}{\varphi} + \delta, \tag{7}$$

$$P_{bR} = A \cdot \frac{z_b \cdot r + j\omega \cdot z_b \cdot r'}{\varphi} + \delta, \tag{8}$$

$$P_{cR} = A \cdot \frac{z_c \cdot r + j\omega \cdot z_c \cdot r'}{\varphi} + \delta, \tag{9}$$

$$P_{eR} = A \cdot \frac{z_e \cdot r + j\omega \cdot z_e \cdot r'}{\varphi} + \delta, \tag{10}$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e = F_a = F - k_1 \cos\omega t - \iint_{S_a} W_a(x,y)dxdy - \iint_{S_e} W_e(x,y)dxdy - f$$

$$F_b = -F + k_1 \cos\omega t + \iint_{S_b} W_b(x,y)dxdy - \iint_{S_e} W_e(x,y)dxdy - L$$

$$F_c = F_d = F_b - k_2 \cos\omega t - \iint_{S_c} W_c(x,y)dxdy - f - \gamma$$

$$F_d = F_b - k_2 \cos\omega t - \iint_{S_d} W_d(x,y)dxdy \tag{11}$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and $f=\eta\Delta s(dv/dy)$.

L is the equivalent load on human face when the vibration board acts on the human face, y is the energy dissipated on elastic element 24, $k_1$ and $k_2$ are the elastic coefficients of elastic element 23 and elastic element 24 respectively, η is the fluid viscosity coefficient, dv/dy is the velocity gradient of fluid, Δs is the cross-section area of a subject (board), A is the amplitude, φ is the region of the sound field, and δ is a high order minimum (which is generated by the incompletely symmetrical shape of the housing);

The sound pressure of an arbitrary point outside the housing, generated by the vibration of the housing 10 is expressed as:

$$P_d = -j\omega\rho_0 \int\int W_d(x_d', y_d') \cdot \frac{e^{jkR}(x_d', y_d')}{4\pi R(x_d', y_d')} dx_d' dy_d', \quad (12)$$

wherein $R(x_d', y_d')=\sqrt{(x-x_d')^2+(y-y_d')^2+(z-z_d)^2}$ is the distance between the observation point (x, y, z) and a point on side d $(x_d', y_d', z_d)$.

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}} P ds$.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d ds$.

The leaked sound wave and the guided sound wave interference may result in a weakened sound wave, i.e., to make $\iint_{S_{hole}} P ds$ and $\iint_{S_{housing}} P_d ds$ have the same value but opposite directions, and the sound leakage may be reduced. In some embodiments, $\iint_{S_{hole}} P ds$ may be adjusted to reduce the sound leakage. Since $\iint_{S_{hole}} P ds$ corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
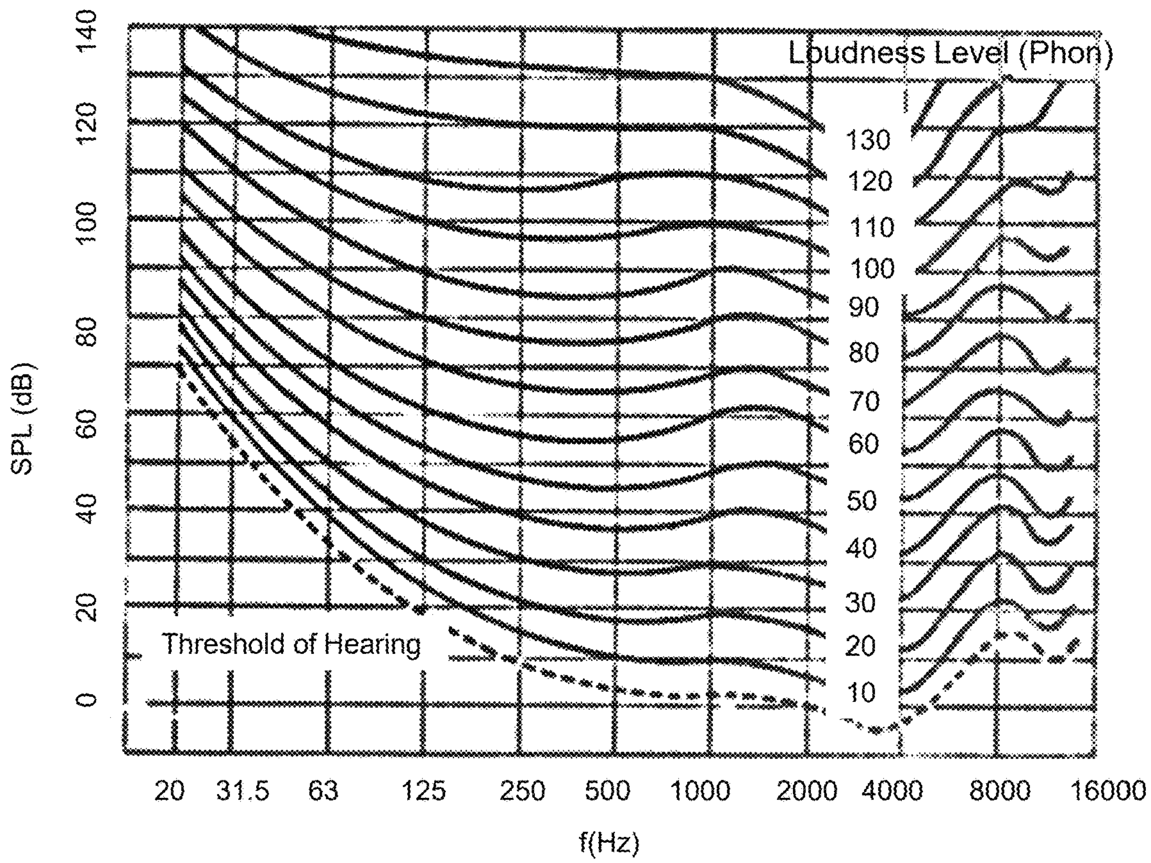
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
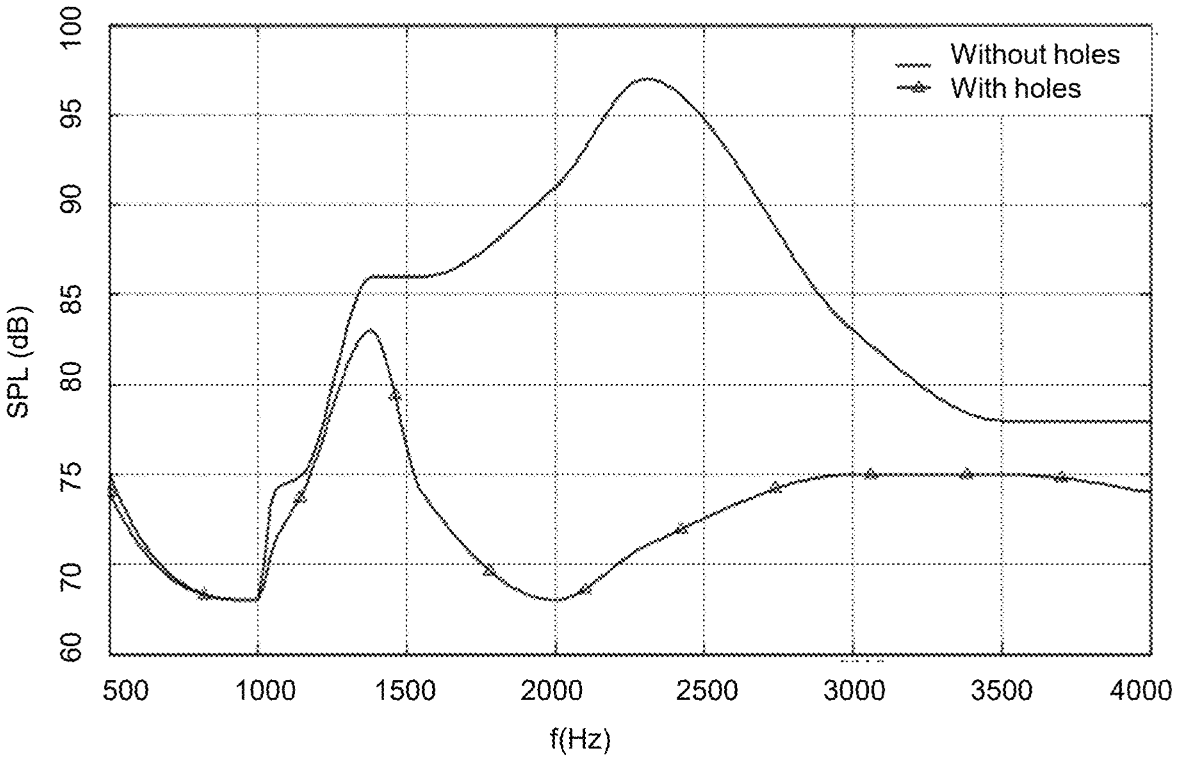
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
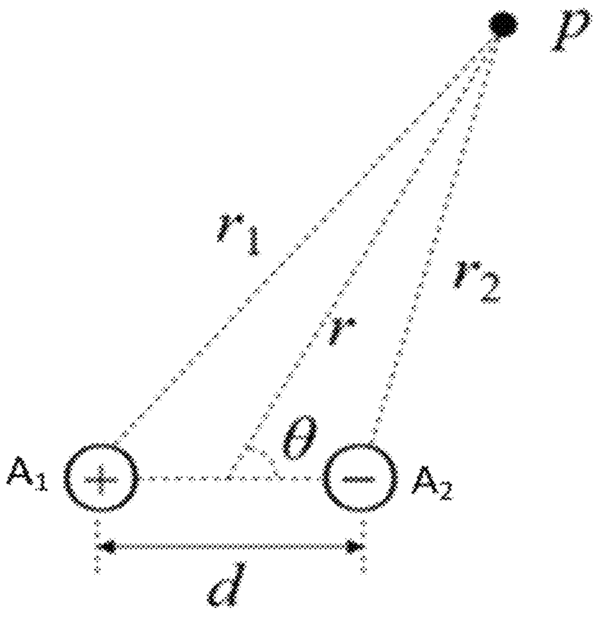
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
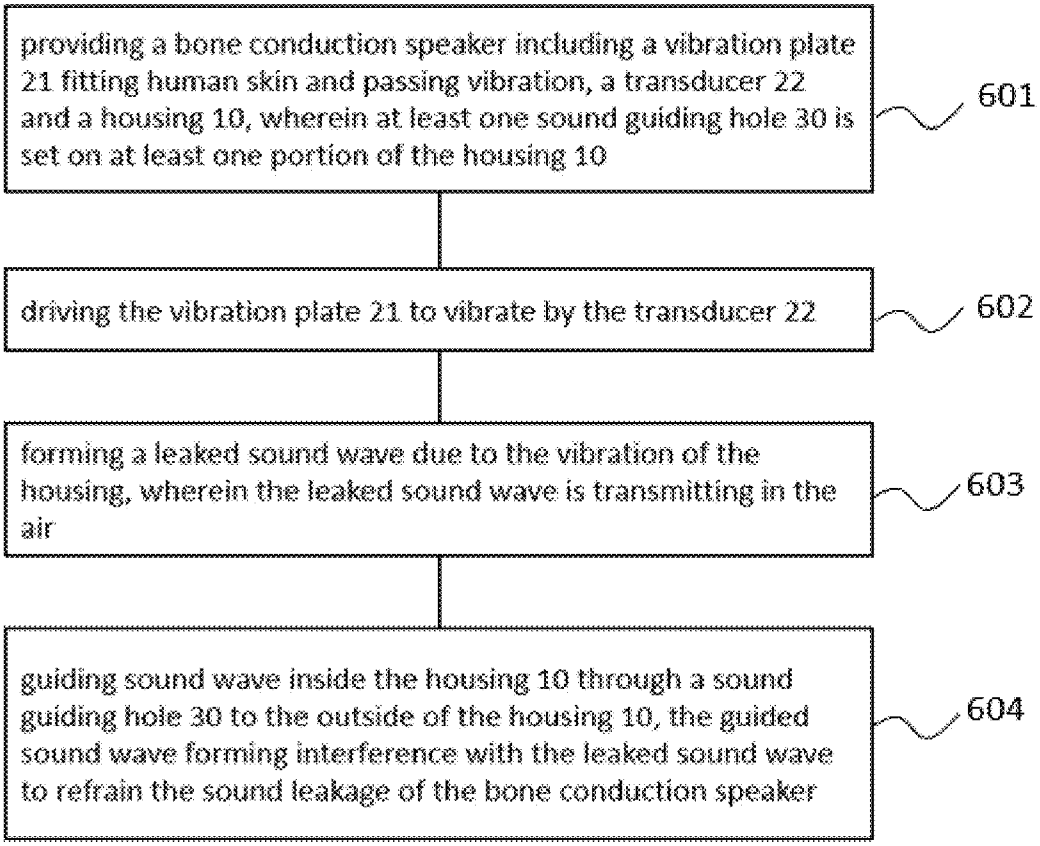
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration plate 21 touching human skin and passing vibrations, a transducer 22, and a housing 10 is provided. At least one sound guiding hole 30 is arranged on the housing 10. At 602, the vibration plate 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
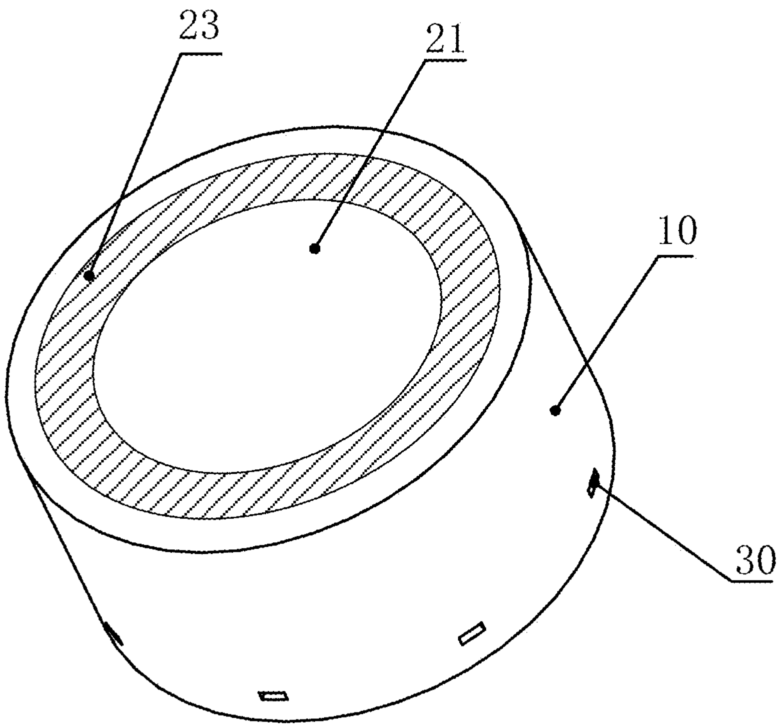
FIGS. 7A and 7B are schematic structures of an exemplary bone conduction speaker according to some embodiments of the present disclosure.
Figure 7B:
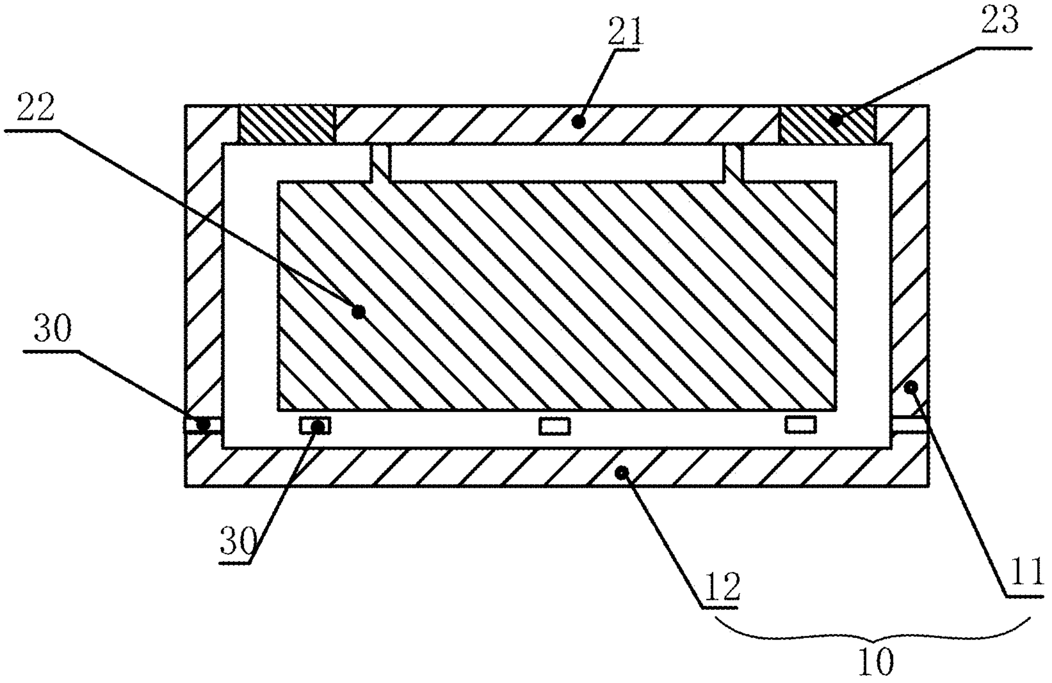

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may located inside the housing and may generate synchronous vibrations with a same frequency.

Figure 7C:
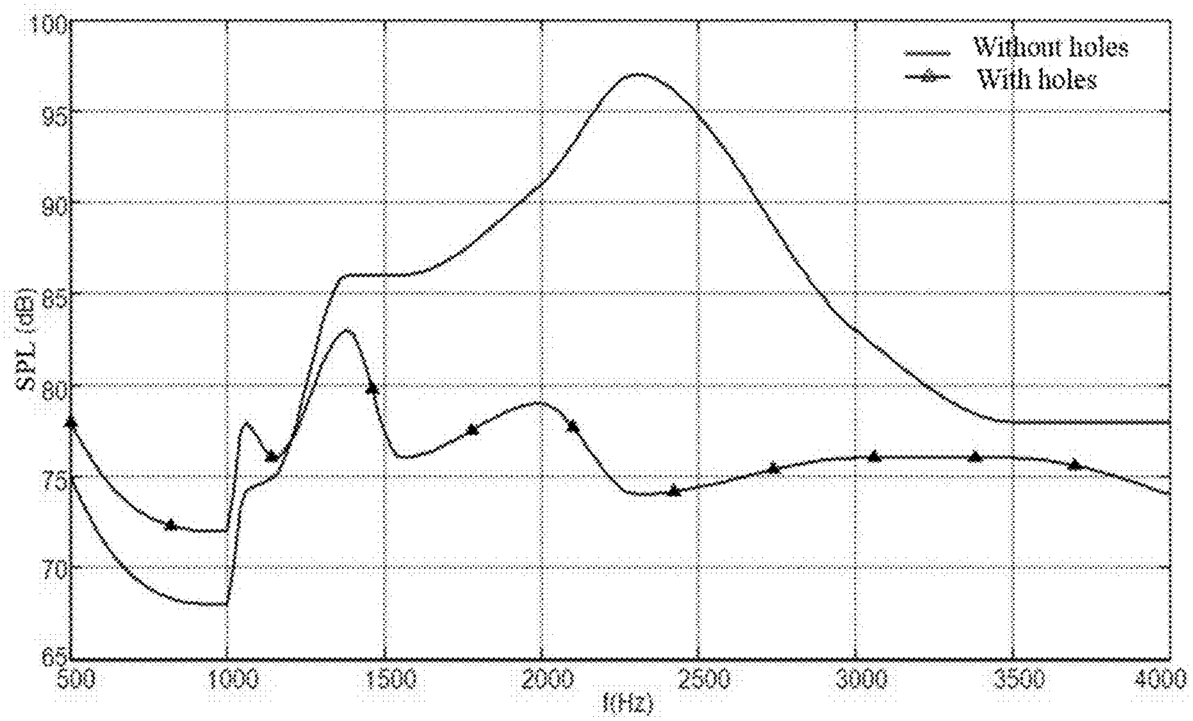
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
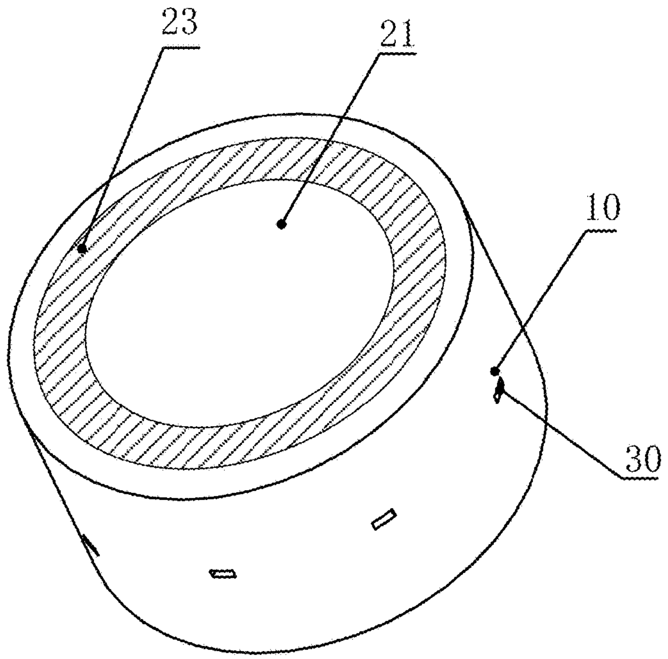
FIGS. 8A and 8B are schematic structure of an exemplary bone conduction speaker according to some embodiments of the present disclosure.
Figure 8B:
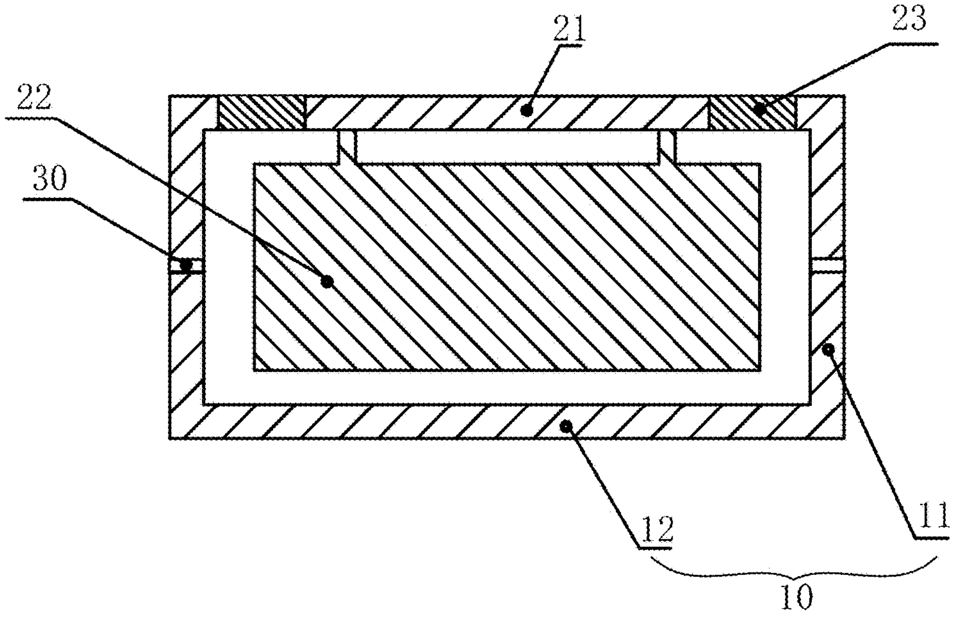

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
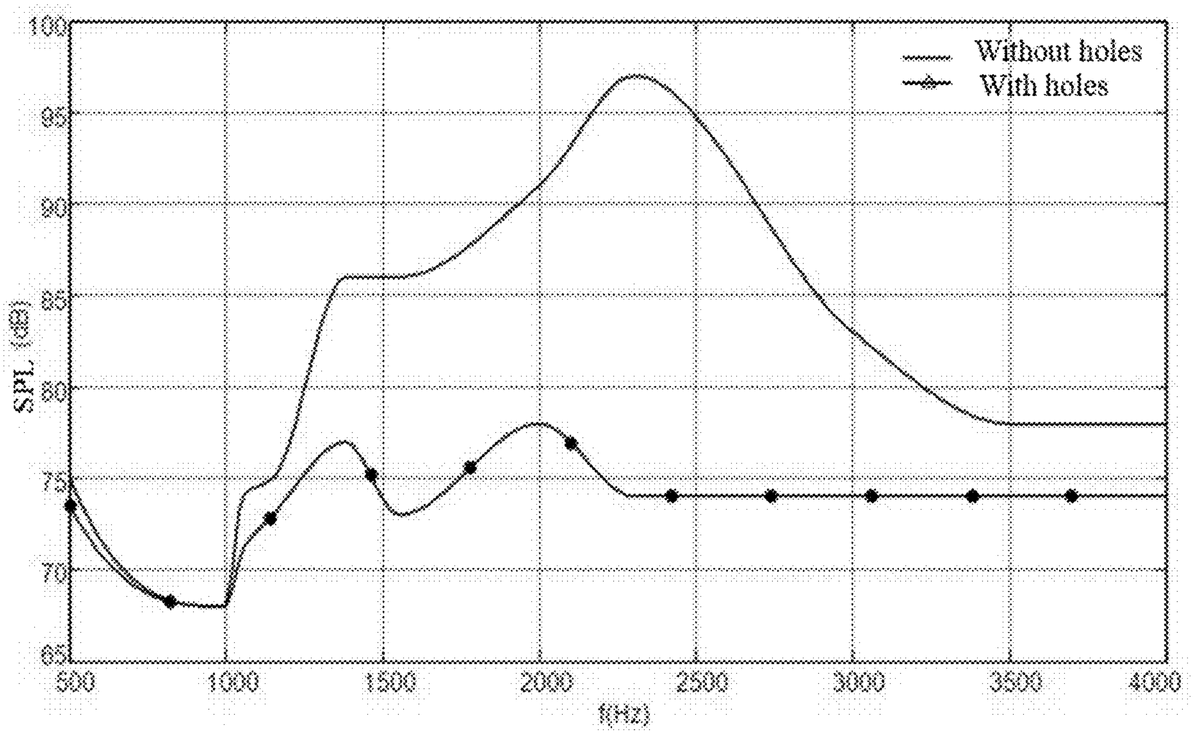
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
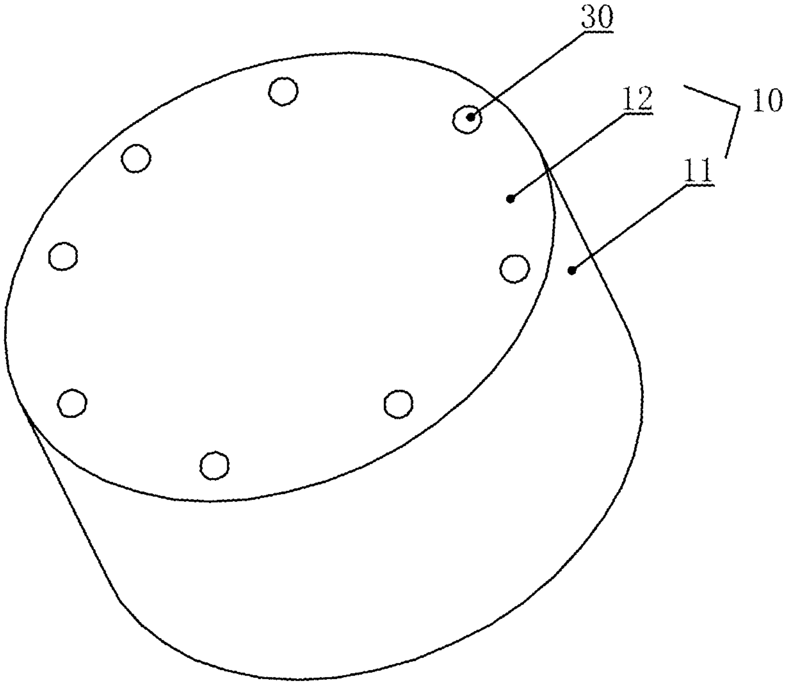
FIGS. 9A and 9B are schematic structures of an exemplary bone conduction speaker according to some embodiments of the present disclosure.
Figure 9B:
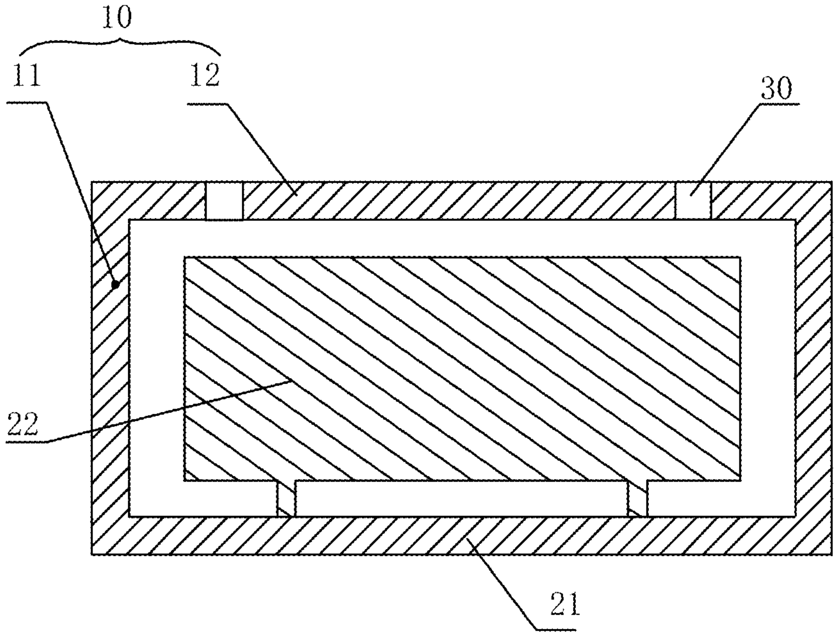

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
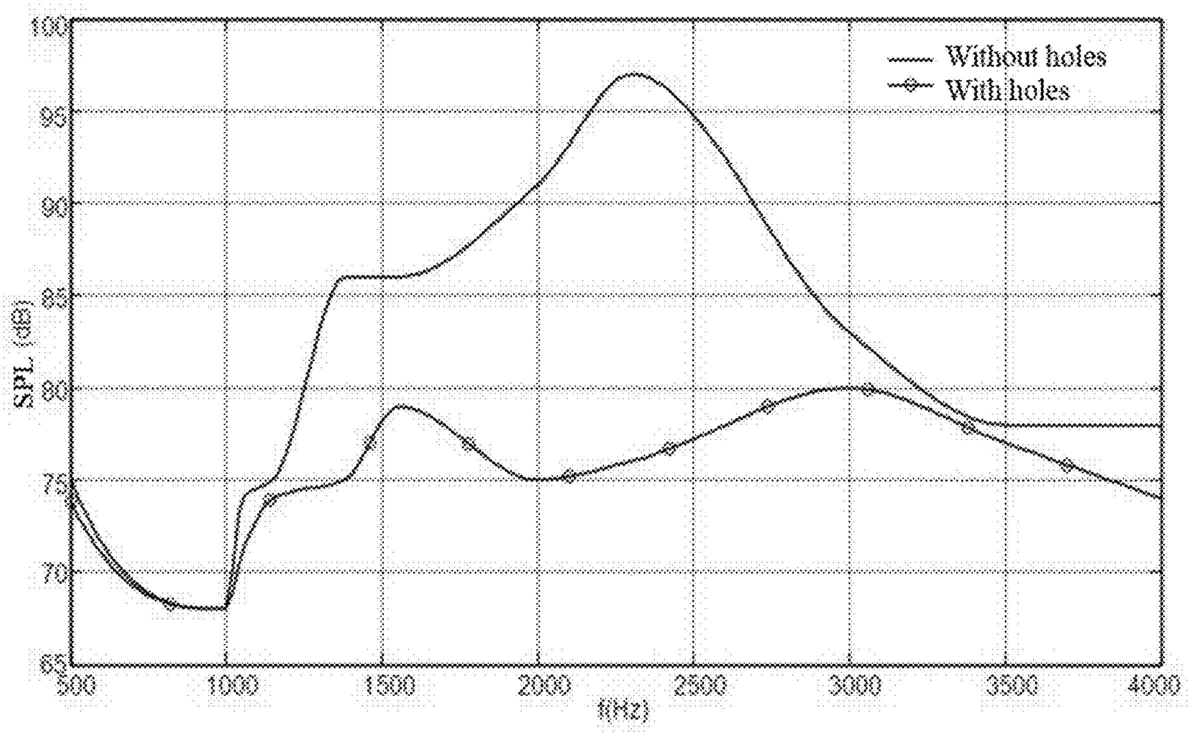
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz~3000 Hz, the effectiveness of reducing sound leakage is outstanding. For example, in the frequency range of 1700 Hz~2700 Hz, the sound leakage is reduced by more than 10 dB; in the frequency range of 2200 Hz~2400 Hz, the sound leakage is reduced by more than 20 dB.

Embodiment Six

Figure 10A:
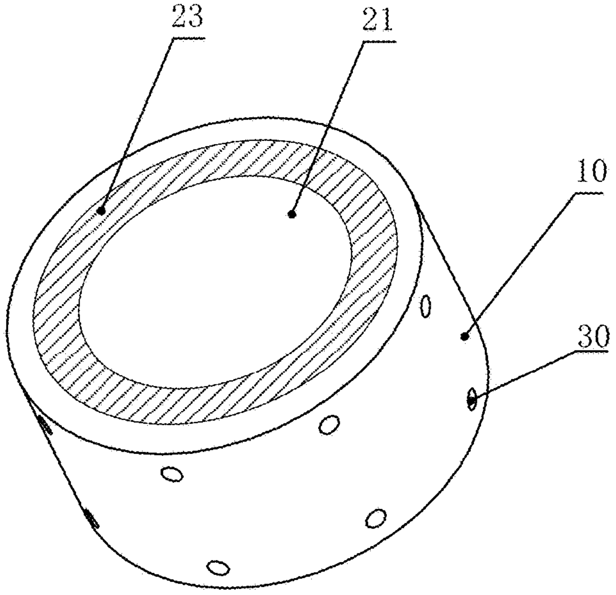
FIGS. 10A and 10B are schematic structures of an exemplary bone conduction speaker according to some embodiments of the present disclosure.
Figure 10B:
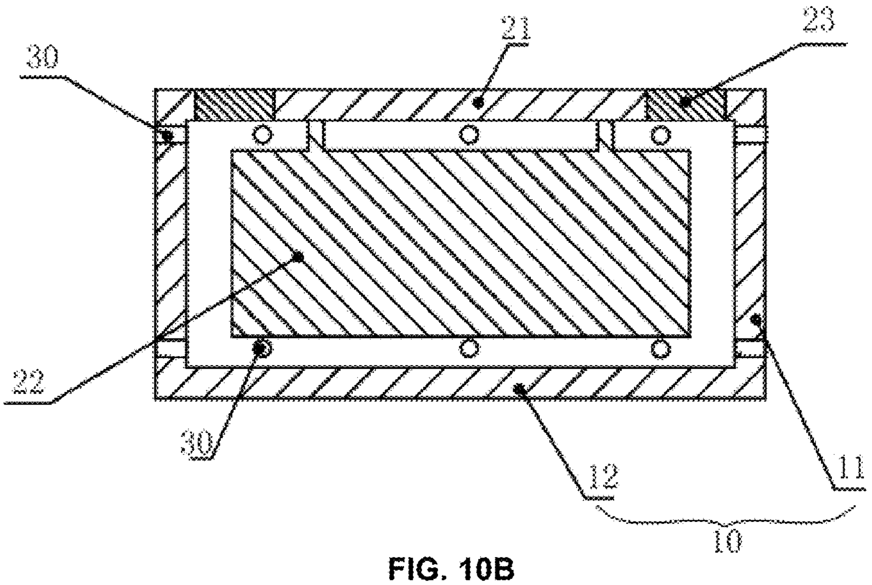

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
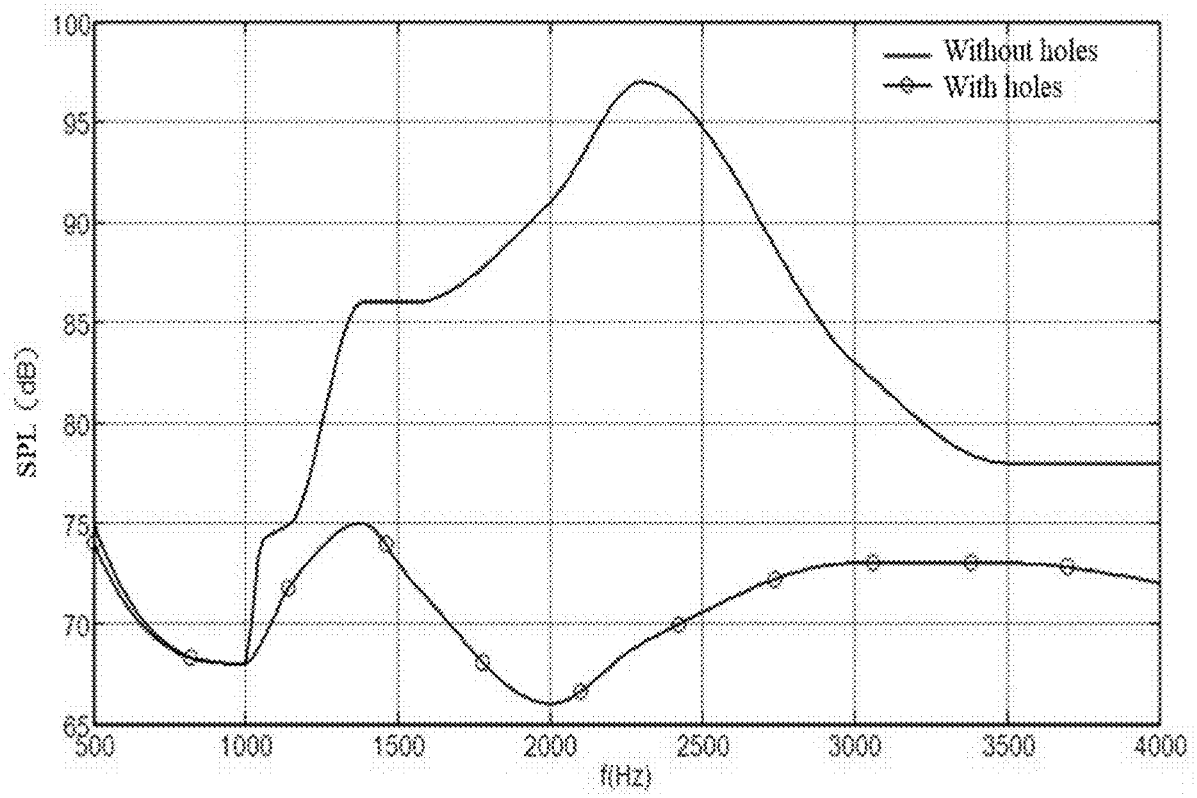
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
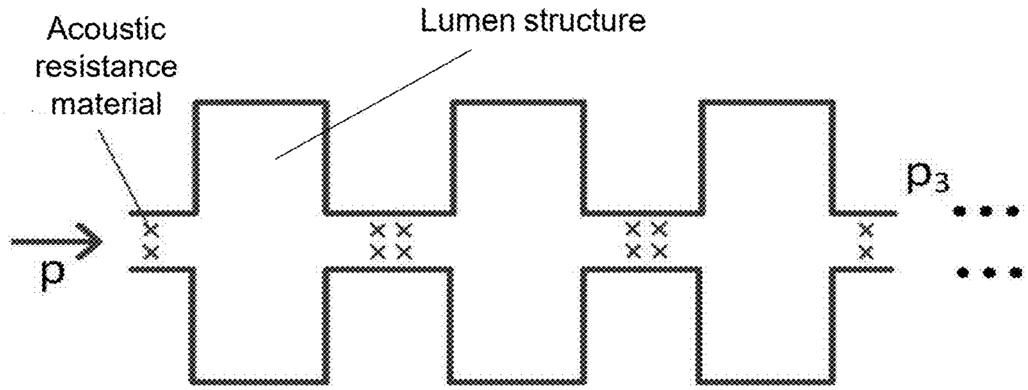
FIG. 10D is a schematic diagram illustrating an acoustic route according to some embodiments of the present disclosure.
Figure 10E:
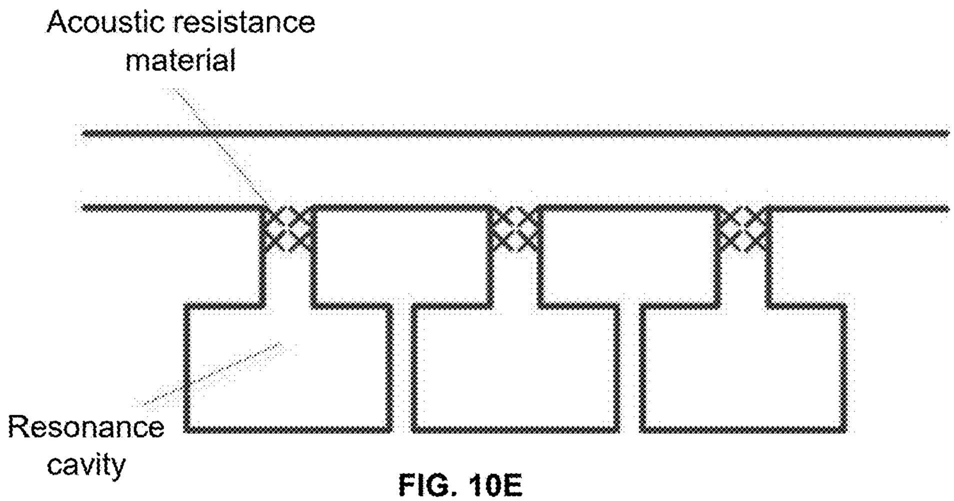
FIG. 10E is a schematic diagram illustrating another acoustic route according to some embodiments of the present disclosure.
Figure 10F:
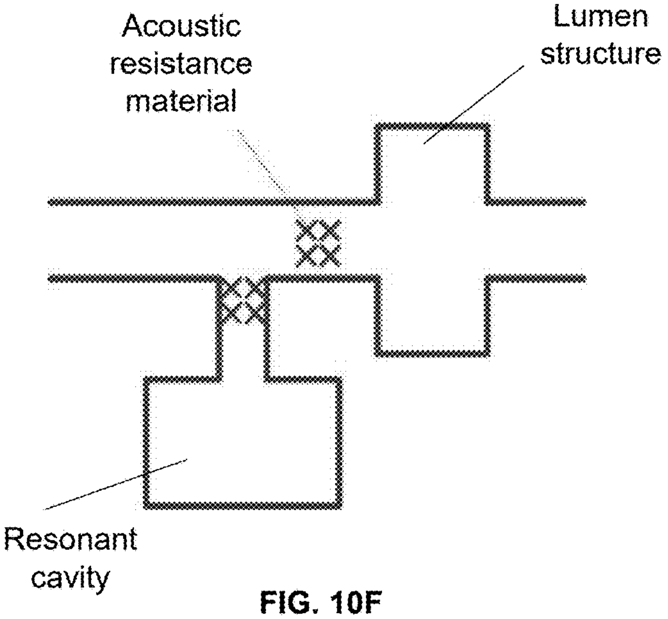
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5

MKS Rayleigh to 500 MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
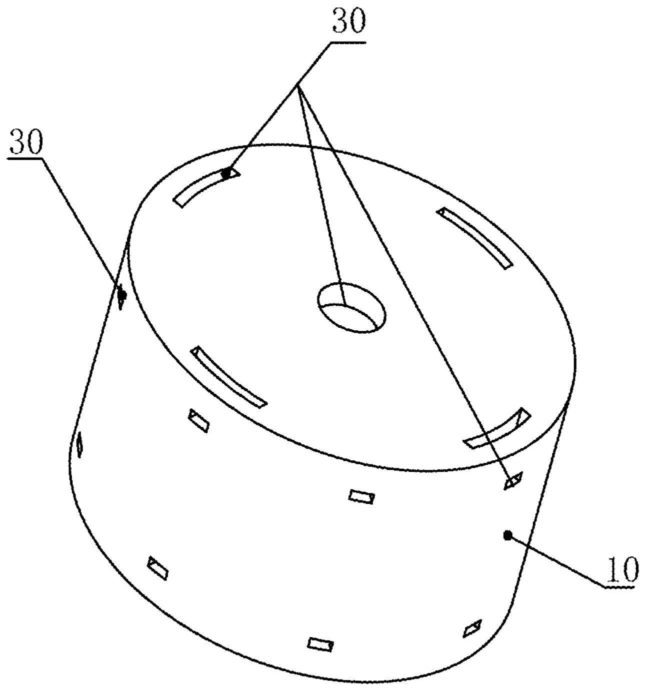
FIGS. 11A and 11B are schematic structures of an exemplary bone conduction speaker according to some embodiments of the present disclosure.
Figure 11B:
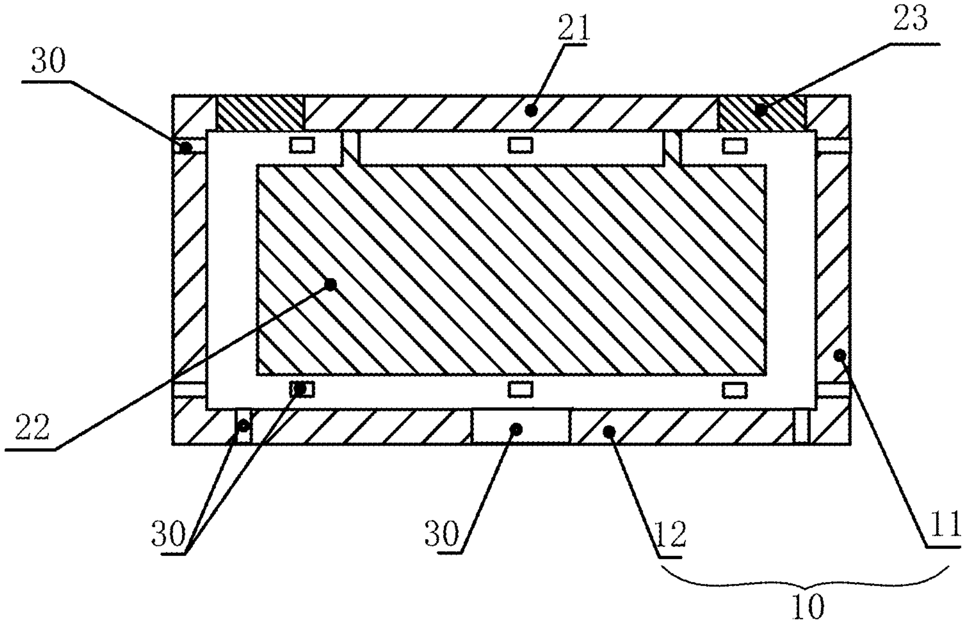

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
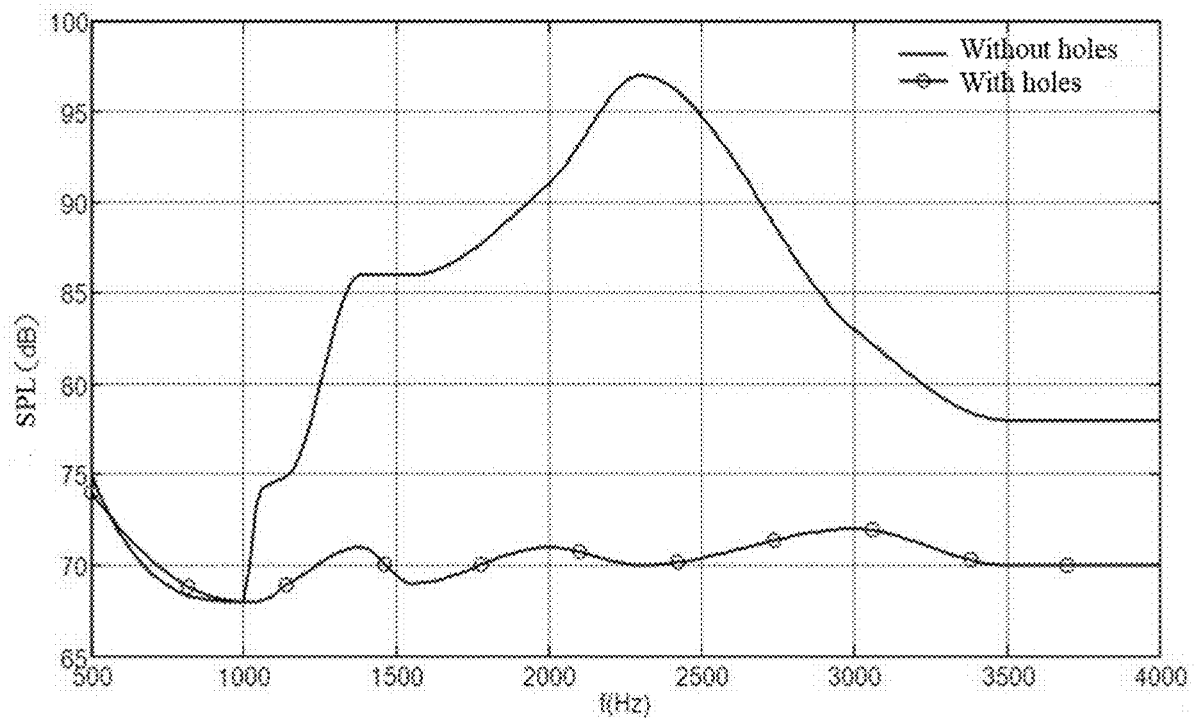
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1700 Hz and 2500 Hz~4000 Hz, this scheme has a better effect of reduced sound leakage than embodiment six.

Embodiment Eight

Figure 12A:
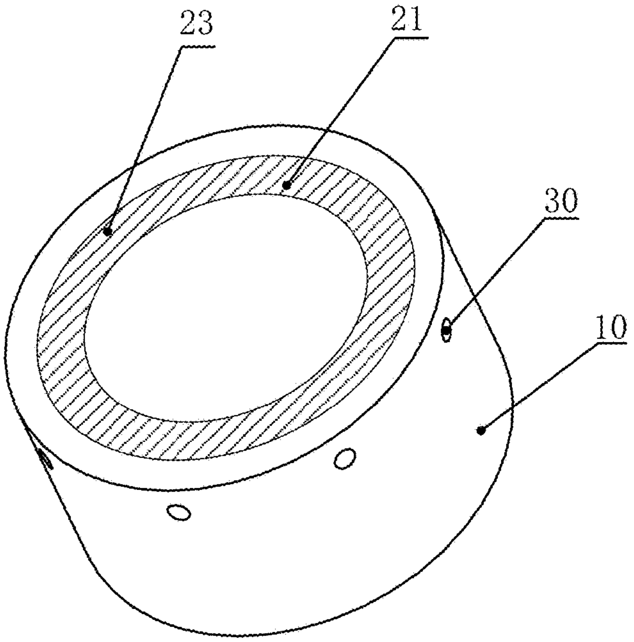
FIGS. 12A and 12B are schematic structures of an exemplary bone conduction speaker according to some embodiments of the present disclosure.
Figure 12B:
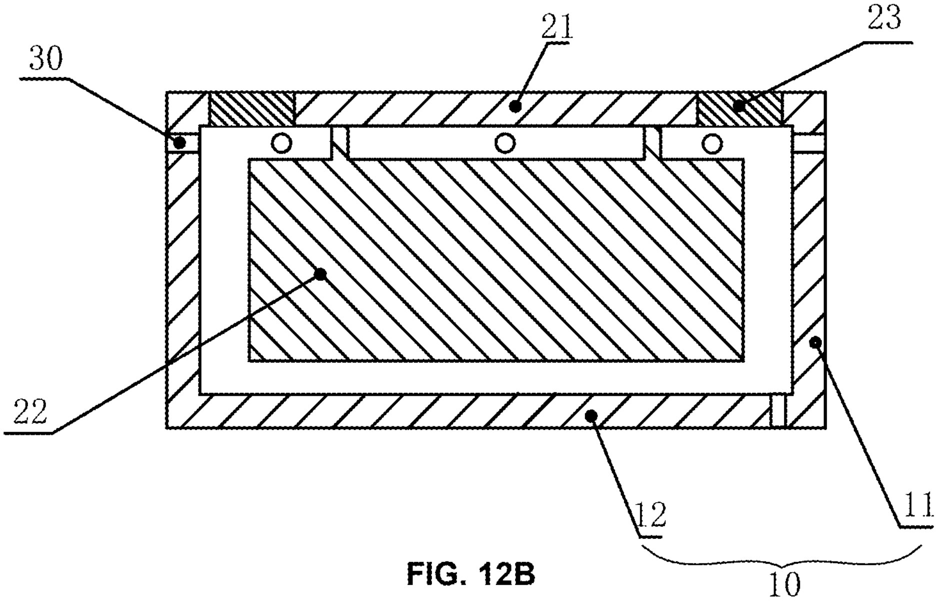

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
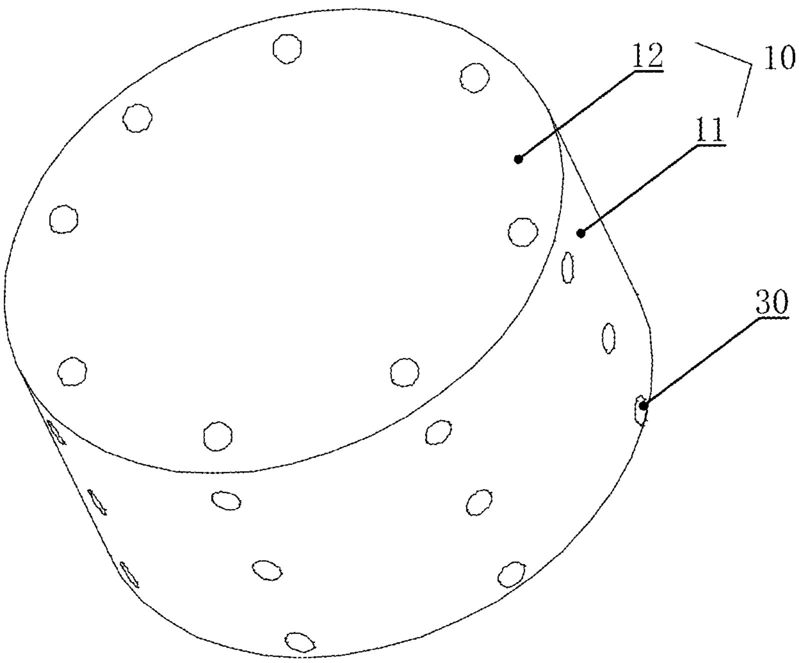
FIGS. 13A and 13B are schematic structures of an exemplary bone conduction speaker according to some embodiments of the present disclosure.
Figure 13B:
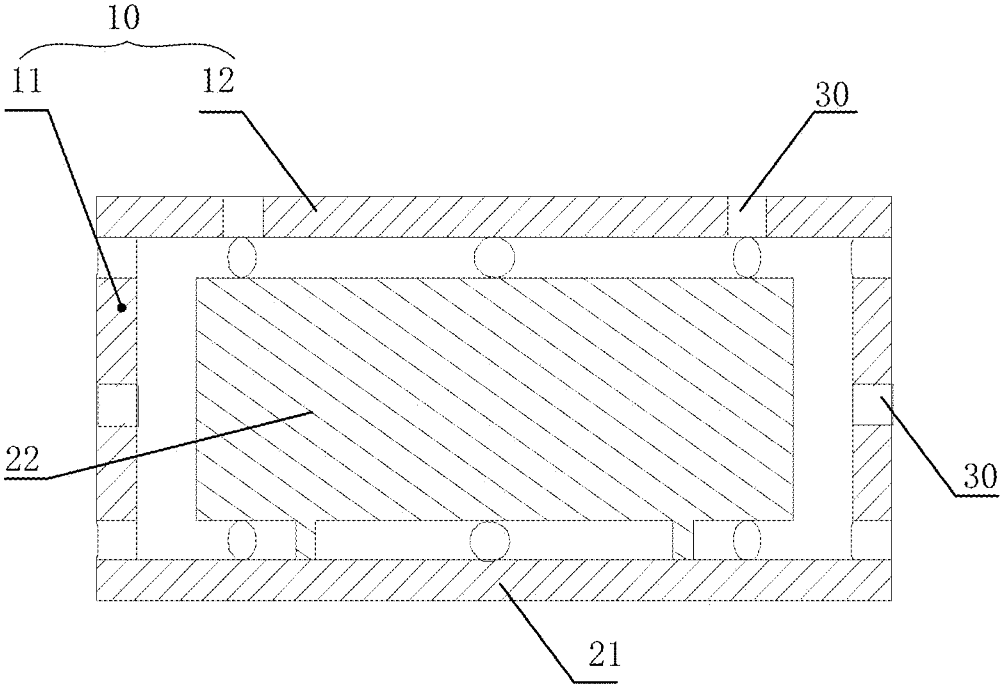

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

In some embodiments, the speaker described in the present disclosure may include an earphone (e.g., an open earphone, a headphone, an MP3 player, a hearing aid), or other electronic device with a speaker function. Merely by way of example, a housing of the speaker may have an ear hook type. That is, the housing of the speaker may cooperate with an auricle of the user, and be hung on an ear of the user, such that the speaker may not fall easily. The speaker with the housing of the ear hook type may also be referred to as an ear hook speaker or an ear hook open speaker. As another example, the housing of the speaker may straddle the user's head and be fixed on the head of the user in a manner similar to a headband. Two ends of the housing may be at a distance from the user's ears. The speaker with the housing of the headband type may also be referred to as a headband open earphone. For illustrations, details regarding the speaker may be with reference to an exemplary ear hook speaker in the following description.

Figure 14:
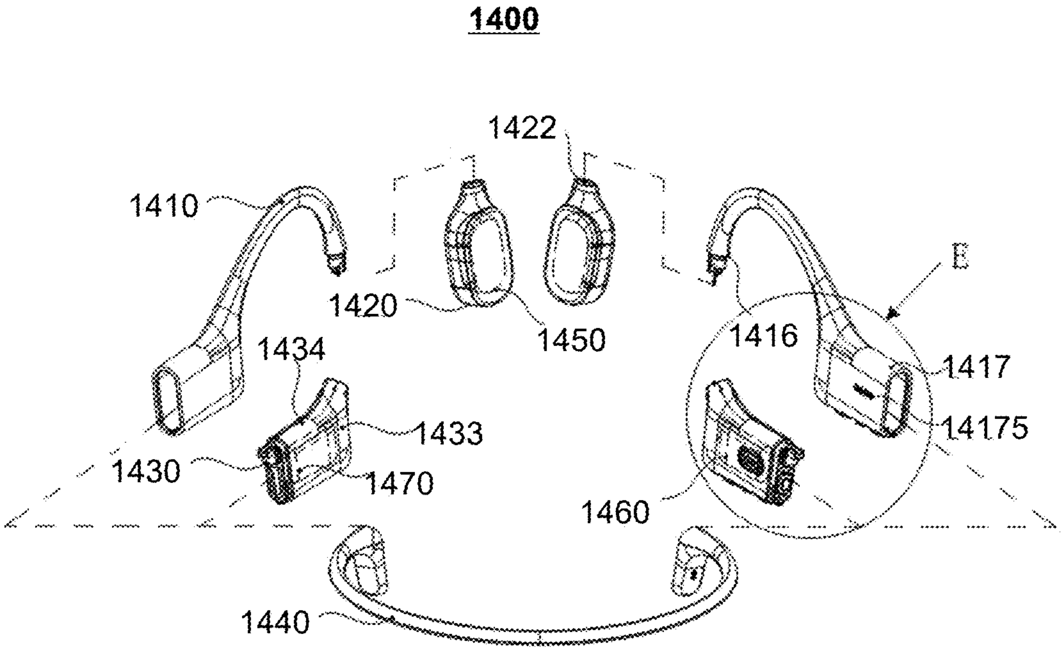
FIG. 14 is a schematic diagram illustrating an exemplary speaker according to some embodiments of the present disclosure

FIG. 14 is a schematic diagram illustrating an exemplary exploded structure of a speaker according to some embodiments of the present disclosure. As shown in FIG. 14, the structure of the speaker 1400 may be designed such that both ear canals are not blocked, which may also be referred to as a binaural speaker 1400. The speaker 1400 may include primary components such as two ear hooks 1410, two core housings 1420, two circuit housings 1430, a rear hook 1440, two earphone cores (also referred to as vocal structures) 1450, a control circuit (also referred to as a circuit board) 1460, a battery (also referred to as a power module) 1470, etc. Each of the ear hooks 1410 may include a protective casing 1416 and a housing casing 1417 on which one or more exposed holes 14175 are set. Each of the core housings 1420 may include a socket 1422. Each of the circuit housings 1430 may include two main sidewalls 1433 and two auxiliary sidewalls 1434. A core housing 1420 and a circuit housing 1430 may be disposed at two ends of an ear hook 1410, respectively. Two ends of the rear hook 1440 may be connected to the two circuit housings 1430, respectively. The two core housings 1420 may be used to accommodate the two earphone cores 1450, respectively. Each of the two earphone cores 1450 may include a transducer as described elsewhere in the present disclosure. The two circuit housings 1430 may be used to accommodate the control circuit 1460 and the battery 1470, respectively. When the speaker 1400 is worn, the two ear hooks 1410 may correspond to the left and right ears of the user, respectively. The rear hook 1440 may correspond to the back of the user's head. The speaker 1400 may transmit sound to a human hearing system through a bone conduction or an air conduction to cause the user to generate a hearing. In some embodiments, the speaker 1400 may also include one or more additional components or one or more components shown in FIG. 14 may be omitted. Merely by way of example, the speaker 1400 may include one or more buttons, a Bluetooth module, a microphone, etc.

Figure 15:
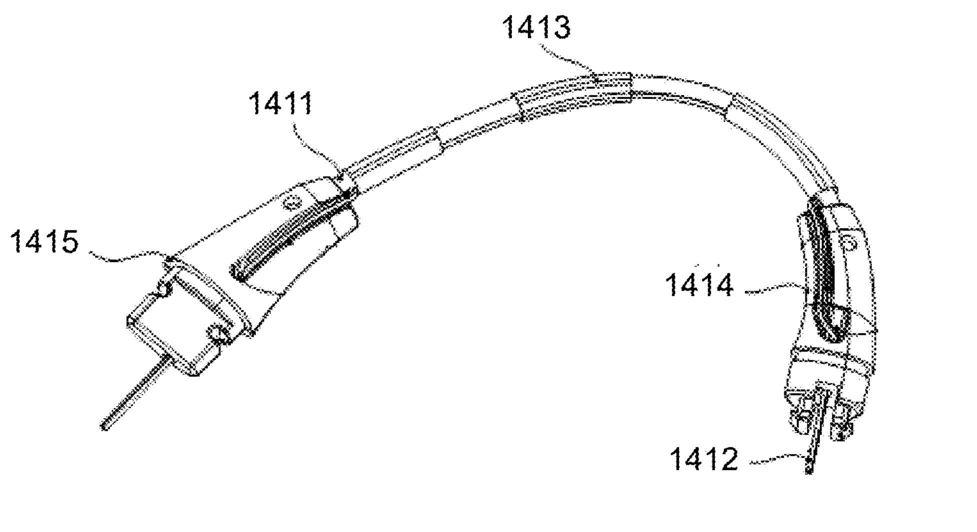
FIG. 15 is a schematic diagram illustrating an exemplary structure of an ear hook of the speaker 1400 shown in FIG. 14 according to some embodiments of the present disclosure.
Figure 16:
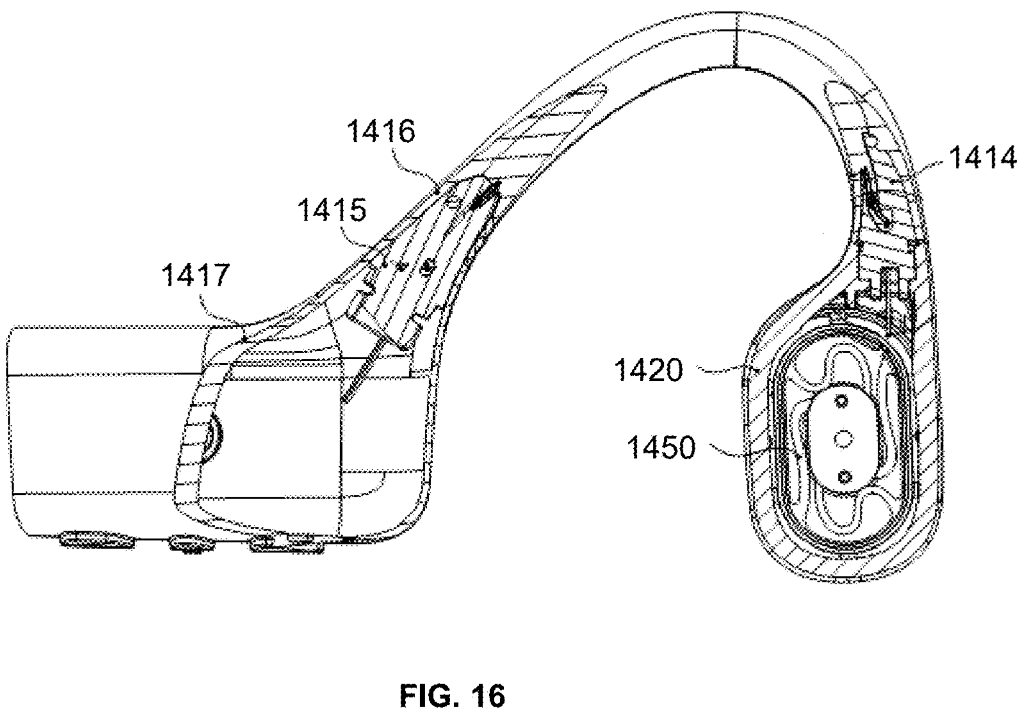
FIG. 16 is a schematic diagram illustrating a partial cross-sectional view of the speaker 1400 shown in FIG. 14 according to some embodiments of the present disclosure.

FIG. 15 is a schematic diagram illustrating an exemplary structure of an ear hook of the speaker 1400 according to some embodiments of the present disclosure. FIG. 16 is a schematic diagram illustrating a partial cross-sectional view of the speaker 1400 according to some embodiments of the present disclosure. In some embodiments, as described in connection with FIGS. 14, 15 and 16, the ear hook 1410 may include an elastic metal wire 1411, a lead wire 1412, a fixed casing 1413, and a plug end 1414 and a plug end 1415 set at both ends of the elastic metal wire 1411. In some embodiments, the ear hook 1410 may also include a protective casing 1416 and a housing casing 1417 that is integrally formed with the protective casing 1416. The protective casing 1416 may be injection-molded on the periphery of the elastic wire 1411, the wire 1412, the fixed casing 1413, the plug end 1414, and the plug end 1415, such that the protective casing 1416 may be fixedly connected to the elastic metal wire 1411, the wire 1412, the fixed casing 1413, the plug end 1414 and the plug end 1415, respectively. Therefore, it is not necessary to manufacture the protective casing 1416 separately and then to cover the periphery of the elastic wire 1411, the plug end 1414, and the plug end 1415, thereby the manufacturing and assembling process may be simplified, and the protective casing 1416 may be more firmly and stably fixed.

In some embodiments, when the protective casing 1416 is molded, the housing casing 1417 may be integrally molded with the protective casing 1416 on a side near the plug end 1415 simultaneously. In some embodiments, the housing casing 1417 may be integrally molded with the protective casing 1416 into a whole. The circuit housing 1430 may be connected to one end of the ear hook 1410 by fixing with the plug end 1415. A socket 22 of the core housing 1420 may be connected to another end of the ear hook 1410 by fixing with the plug end 1414. The housing casing 1417 may cover the periphery of the circuit housing 1430. In some embodiments, the protective casing 1416 and the housing casing 1417 may be made of a soft material with a certain elasticity, such as soft silicone, rubber, or the like. In some embodiments, the housing casing 1417 may include a bag-shaped structure with one end open, such that the circuit housing 1430 may enter the inside of the housing casing 1417 through the open end of the housing casing 1417. Specifically, the open end of the housing casing 1417 may be an end of the housing casing 1417 departing from the protective casing 1416, such that the circuit housing 1430 may enter the inside of the housing casing 1417 from the end of the housing casing 1417 away from the protective casing 1416 and be covered by the housing casing 1417.

Figure 17:
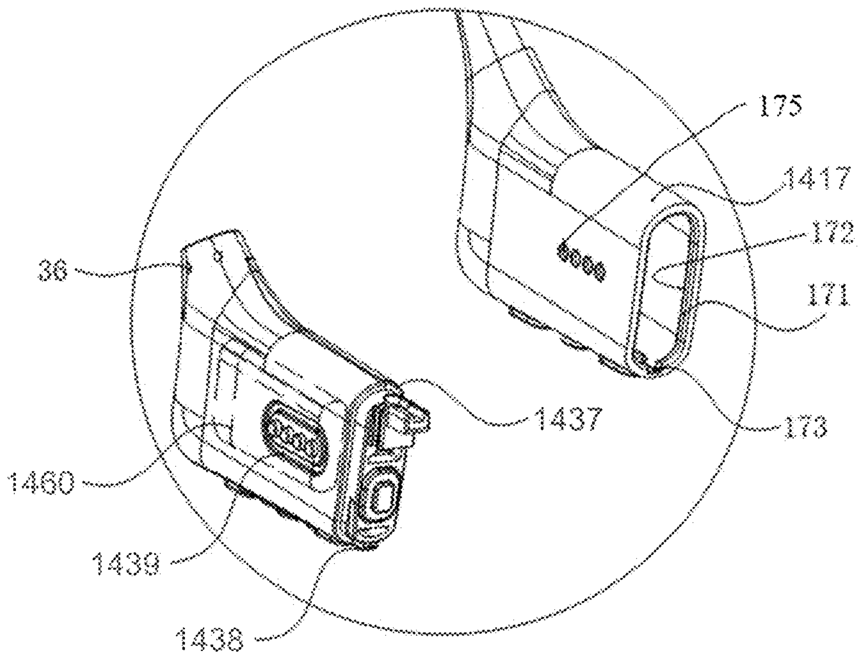
FIG. 17 is a schematic diagram illustrating a partially enlarged view of part E in FIG. 14 according to some embodiments of the present disclosure.

FIG. 17 is a schematic diagram illustrating a partially enlarged view of part E in FIG. 14 according to some embodiments of the present disclosure. In connection with FIGS. 14 and 15, in some embodiments, an annular flange 171 protruding inward may be set on the open end of the housing casing 1417. The end of the circuit housing 1430 away from the ear hook 1410 may be set as a stair shape, thereby forming an annular platform 1437. When the housing casing 1417 covers the periphery of the circuit housing 1430, the annular flange 171 may be in contact with the annular platform 1437. The annular flange 171 may be formed by the inner wall surface of the open end of the housing casing 1417 protruding to a certain thickness toward the inside of the housing casing 1417. The annular flange 171 may include a flange surface 172 facing the ear hook 1410. The annular platform 1437 may be opposite to the flange surface 172 and face a direction of the circuit housing 1430 departing from the ear hook 1410. The height of the flange surface 172 of the annular flange 171 may not be greater than the height of the annular platform 1437, such that when the flange surface 172 of the annular flange 171 is in contact with the annular platform 1437, the inner wall surface of the housing casing 1417 may be in fully contact with the sidewall surface of the circuit housing 1430, such that the housing casing 1417 may tightly cover the periphery of the circuit housing 1430. In some embodiments, a sealant may be applied in a joint region of the annular flange 171 and the annular platform 1437. Specifically, when the housing casing 1417 is coated, a sealant may be pasted on the annular platform 1437 to firmly connect the housing casing 1417 with the circuit housing 1430.

In some embodiments, a positioning block 1438 may be set on the circuit housing 1430. The positioning block 1438 may be configured on the annular platform 1437. The positioning block 1438 may extend along a direction of the circuit housing 1430 away from the ear hook 1410. Specifically, the positioning block 1438 may be configured on an auxiliary sidewall 1434 of the circuit housing 1430. A thickness of the positioning block 1438 protruding on the auxiliary sidewall 1434 may be consistent with the height of the annular platform 1437. One or more positioning blocks 1438 may be set according to requirements. Accordingly, a positioning groove 173 corresponding to the positioning block 1438 may be configured at the annular flange 171 of the housing casing 1417, such that when the housing casing 1417 covers the periphery of the circuit housing 1430, the positioning groove 173 may cover at least a portion of the positioning block 1438.

Figure 18:
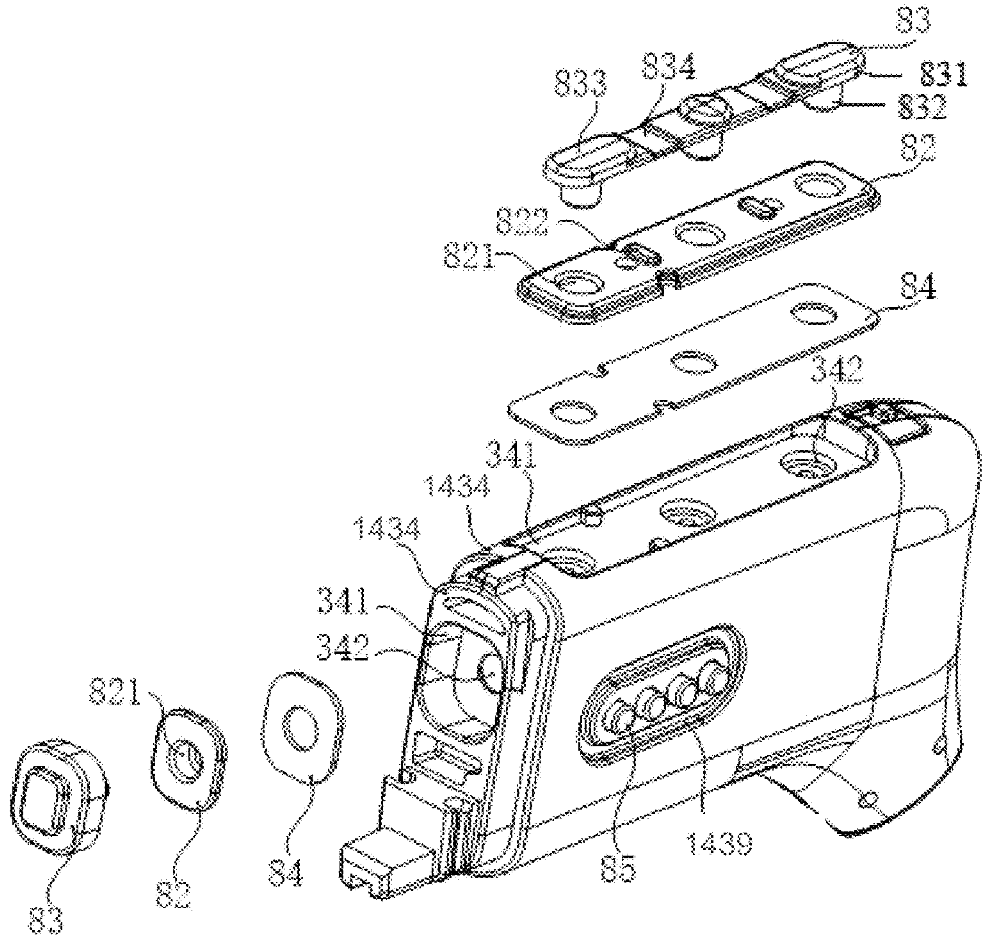
FIG. 18 is a schematic diagram illustrating an exemplary exploded view of a circuit housing and a button structure according to some embodiments of the present disclosure.
Figure 19:
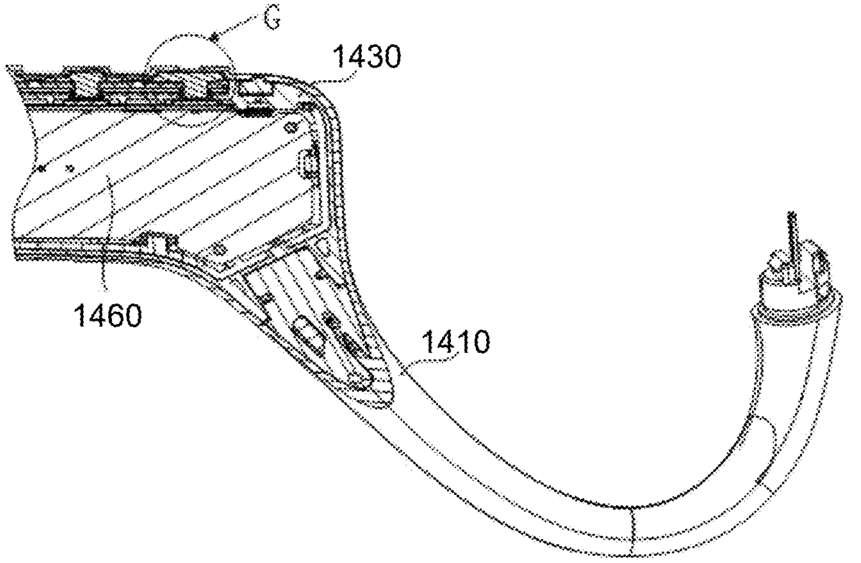
FIG. 19 is a schematic diagram illustrating an exemplary partial cross-sectional view of a circuit housing, a button structure, and an ear hook according to some embodiments of the present disclosure.
Figure 20:
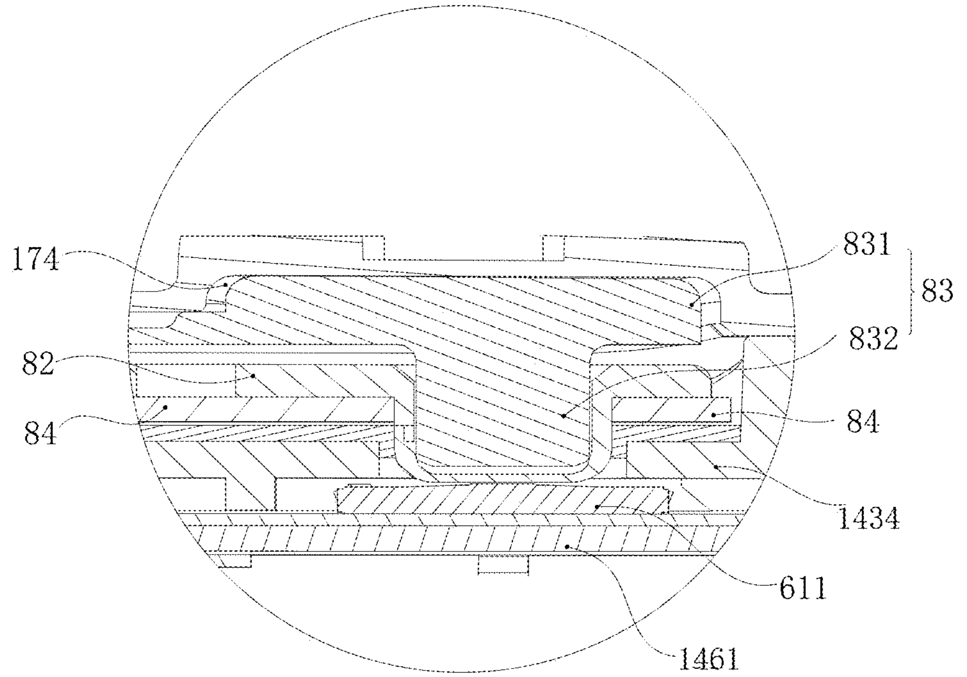
FIG. 20 is schematic diagram illustrating an exemplary partial enlarged view of part G shown in FIG. 19 according to some embodiments of the present disclosure.

FIG. 18 is a schematic diagram illustrating an exemplary exploded view of a circuit housing and a button structure according to some embodiments of the present disclosure. FIG. 19 is a schematic diagram illustrating an exemplary partial cross-sectional view of a circuit housing, a button structure, and an ear hook according to some embodiments of the present disclosure. FIG. 20 is a schematic diagram illustrating an exemplary partial enlarged view of part G shown in FIG. 19 according to some embodiments of the present disclosure. In connection with FIGS. 14, 18, 19, and 20, in some embodiments, a button structure may be set on the speaker 1400. In some embodiments, the circuit housing 1430 may be set as a flat shape. Two sidewalls oppositely configured with relatively large areas of the circuit housing 1430 may be the main sidewalls 1433. Two sidewalls oppositely configured with relatively small areas connected to the two main sidewalls 1433 may be auxiliary sidewalls 1434. A first recessed area 341 may be set on the outer surface of an auxiliary sidewall 1434 of the circuit housing 1430. A button hole 342 may be further set in the first recessed area 341. The button hole 342 may connect the outer surface and the inner surface of the auxiliary sidewall 1434. The auxiliary sidewalls 1434 of the circuit housing 1430 may include an auxiliary sidewall 1434 facing the back side of a user's head when the user wears the speaker 1400, and may also include an auxiliary sidewall 1434 facing the lower side of the user's head when the user wears the speaker 1400. The number (or count) of the first recessed areas 341 may be one or more. One or more button holes 342 may be set in each first recessed area 341 according to actual requirements, which is not specifically limited herein.

In some embodiments, the speaker 1400 may also include an elastic pad 82 and a button 83, and the control circuit 1460 may include a button circuit board 1461. The elastic pad 82 may be set on the first recessed area 341. Specifically, the elastic pad 82 may be fixed on the outer surface of an auxiliary sidewall 1434 corresponding to the first recessed area 341 to cover the outside of the button hole 342. Thereby, the elastic pad 82 may play a role of sealing and waterproofing, such that external liquid may be prevented from entering the inside of the circuit housing 1430 through the button hole 342. In some embodiments, a second recessed area 821 corresponding to the button hole 342 may be set on the elastic pad 82. The second recessed area 821 may extend to the inside of the button hole 342. In some embodiments, the elastic pad 82 may be made of a soft material, such as a soft silicone or rubber. In addition, the elastic pad 82 may be thin. It may be difficult for the thin elastic pad 82 to be adhered firmly when the thin elastic pad 82 is directly bonded to the outer surface of the auxiliary sidewall 1434. As the elastic pad 82 is set between the button 83 and the button hole 342, when the user presses the button, the elastic pad 82 may generate a force opposite to the pressing direction due to the deformation, preventing the button from moving relative to the button hole 342.

In some embodiments, a rigid pad 84 may be disposed between the elastic pad 82 and the circuit housing 1430. The rigid pad 84 and the elastic pad 82 may be closely fixed to each other, specifically, by means of gluing, bonding, injection molding, etc. The rigid pad 84 and the auxiliary sidewall 1434 may further be bonded. Specifically, double-sided adhesive may be used to form an adhesive layer between the rigid pad 84 and the auxiliary sidewall 1434, such that the elastic pad 82 may be firmly fixed on the outer surface of the auxiliary sidewall 1434. In addition, as the elastic pad 82 is soft and thin, it is difficult to maintain a flat state when the user presses the button. By abutting the rigid pad 84, the elastic pad 82 may be kept flat.

In some embodiments, a through hole may be set on the rigid pad 84, such that the second recessed area 821 of the elastic pad 82 may further extend to the inside of the button hole 342 through the through hole. In some embodiments, the rigid pad 84 may be made of stainless steel, or other rigid materials (e.g., plastic). The rigid pad 84 may abut the elastic pad 82 by integral molding.

In some embodiments, the button 83 may include a button body 831 and a button contact point 832 protruding on a side of the button body 831. The button body 831 may be disposed on a side of the elastic pad 82 away from the circuit housing 1430, and the button contact point 832 may extend to the inside of the second recessed area 821 and further extend to the button hole 342. As the speaker 1400 in this embodiment is relatively thin and light and the pressing route of the button 83 is short, using a soft button may reduce the user's pressing feeling and bring an unsatisfactory experience, while using the button 83 made of a hard plastic material may bring a well pressing feeling for the user.

The button circuit board 1461 may be disposed inside the circuit housing 1430, and a button switch 611 corresponding to the button hole 342 may be set on the button circuit board 1461. Therefore, when the user presses the button 83, the button contact point 832 may contact and trigger the button switch 611 to further implement corresponding function.

In this embodiment, by setting the second recessed area 821 on the elastic pad 82, on one hand, the second recessed area 821 may cover the entire button hole 342, thereby improving the waterproof performance. On the other hand, in the natural state, the button contact point 832 may extend to the inside of the button hole 342 through the second recessed area 821, thereby shortening the button pressing route and reducing the space occupied by the button structure. Therefore, the speaker 1400 may both have a good waterproof performance and occupy less space.

In some embodiments, the button 83 may include one or more button single bodies 833. In an application scenario, the button 83 may include at least two button single bodies 833 disposed away from each other and at least one connecting portion 834 connected to the button single bodies 833. The button single bodies 833 and the connecting portion(s) 834 may be integrally formed. Correspondingly, a button contact point 832 may be set on each button single body 833. Each button single body 833 may further correspond to a button hole 342 and a button switch 611. A plurality of button single bodies 833 may be set on each of the first recessed areas 341. The user may trigger different button switches 611 by pressing different button single bodies 833 to further realize various functions.

In some embodiments, elastic bumps 822 may be set on the elastic pad 82 for supporting the connecting portion 834. As the button 83 includes a plurality of connected button single bodies 833, the setting of the elastic bumps 822 may enable a specific button single body 833 being individually pressed when the user presses the specific button single body 833, avoiding other button single bodies 833 being pressed together due to linkage. Thereby, the ability to accurately trigger the corresponding button switch 611 may be provided. It should be noted that the elastic bump 822 may not be necessary. For example, the elastic bump 822 may be a protruding structure without elasticity, or the protruding structure may not be set according to actual requirements. In some embodiments, a groove 174 corresponding to the button 83 may be set on the inner wall of the housing casing 1417, such that the outer periphery of the circuit housing 1430 and the button may be coated.

Figure 21:
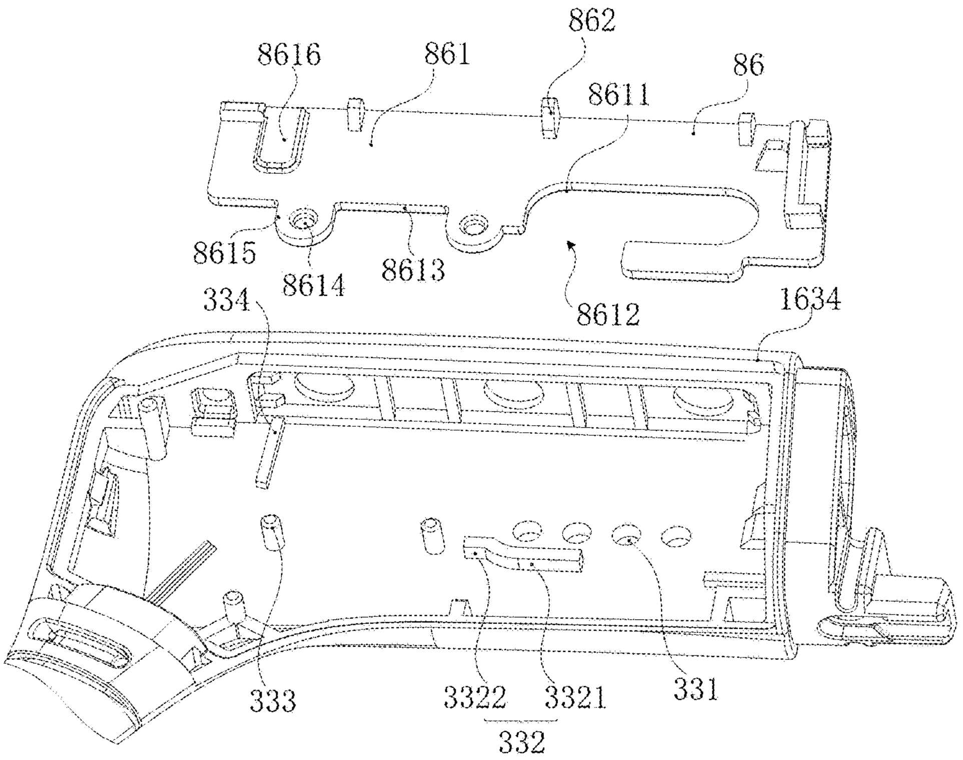
FIG. 21 is a schematic diagram illustrating an exemplary exploded view of a partial structure of a circuit housing and auxiliary piece according to some embodiments of the present disclosure.
Figure 22:
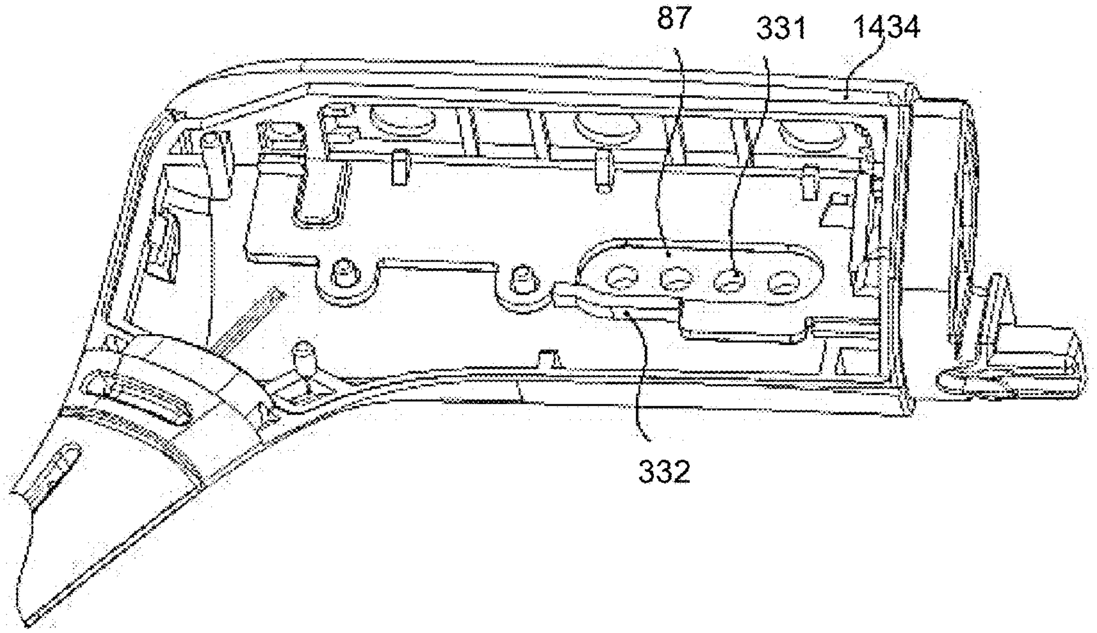
FIG. 22 is schematic diagram illustrating an exemplary partial structure of a circuit housing and an auxiliary piece according to some embodiments of the present disclosure.

FIG. 21 is a schematic diagram illustrating an exemplary exploded view of a partial structure of a circuit housing and auxiliary piece according to some embodiments of the present disclosure. FIG. 22 is schematic diagram illustrating an exemplary partial structure of a circuit housing and an auxiliary piece according to some embodiments of the present disclosure. In connection with FIGS. 14, 21 and 22, in some embodiments, the speaker 1400 may also include the auxiliary piece 86 located inside the circuit housing 1430. The auxiliary piece 86 may include a board 861. A hollowed area 8611 may be set on the board 861. The board 861 may be disposed on the inner surface of the main sidewall 1433 by means of hot melting, hot pressing, or bonding, such that a mounting hole 331 set on the main sidewall 1433 may be located inside the hollowed area 8611. Specifically, the board surface of the board 861 may abut the inner surface of the main sidewall 1433 in parallel. The auxiliary piece 86 may have a certain thickness. When disposed on the inner surface of the main sidewall 1433, the auxiliary piece 86 with the inner sidewall of the hollowed area 8611 of the auxiliary piece 86 and the main sidewall 1433 may together form a glue groove 87 located at the periphery of the conductive column 85 inserted into the mounting hole 331.

In some embodiments, a sealant may be applied in the glue groove 87 to seal the mounting hole 331 from the inside of the circuit housing 1430 to improve a sealing performance of the circuit housing 1430, thereby improving the waterproof performance of the speaker 1400.

In some embodiments, the material of the auxiliary piece 86 may be the same as that of the circuit housing 1430. The auxiliary piece 86 may be molded separately from the circuit housing 1430. It should be noted that, during the molding stage of the circuit housing 1430, there may often be other structures near the mounting hole 331, such as molding the button hole 342. Molds corresponding to these structures during molding may need to be removed from the inside of the circuit housing 1430. At this time, if the glue groove 87 corresponding to the mounting hole 331 is integrally formed directly inside the circuit housing 1430, the protrusion of the glue groove 87 may interfere with the removal of the molds of these structures, thereby causing inconvenience in production. In this embodiment, the auxiliary piece 86 and the circuit housing 1430 may be separate structures. After the two structures being separately molded, the auxiliary piece 86 may be installed inside the circuit housing 1430 and form the glue groove 87 together with the main sidewall 1433 of the circuit housing 1430, such that during the molding stage of the circuit housing 1430, the molds of part of the structures may not be blocked when removing from the inside of the circuit housing 1430, which causes a smooth progress in production.

In some embodiments, when the circuit housing 1430 is molded, the removal of the molds may only occupy a part of the space of the glue groove 87. A part of the glue groove 87 may be integrally formed on the inner surface of the main sidewall 1433 without affecting the removal of the mold, and the other part of the glue groove 87 may still be formed by the auxiliary piece 86.

In some embodiments, a first strip rib 332 may be integrally formed on the inner surface of the main sidewall 1433, and the location of the first strip rib 332 may not affect the removal of the mold of the circuit housing 1430. A notch 8612 may be set in the hollowed area 8611 of the auxiliary piece 86. The first strip rib 332 may correspond to the notch 8612. After the circuit housing 1430 and the auxiliary piece 86 being respectively formed, the auxiliary piece 86 may be placed on the inner surface of the main sidewall 1433, such that the first strip rib 332 at least partially fits the notch 8612, and then the first strip rib 332 and the auxiliary piece 86 may cooperate to make the glue groove 87 closed.

In this embodiment, as the first strip rib 332 may not block the removal of the molds, the sidewall of the glue groove 87 may be composed of the first strip rib 332 and auxiliary piece 86 which are integrally formed on the inner surface of the main sidewall 1433.

In some embodiments, the first strip rib 332 may further extend to abut the side edge 8613 of the board 861, thereby positioning the board 861. The first strip rib 332 may include a rib main body 3321 and a positioning arm 3322. The rib main body 3321 may be configured to match and fit the notch 8612 of the hollowed area 8611, thereby forming a sidewall of the glue groove 87. The positioning arm 3322 may be formed by extending from one end of the rib main body 3321 to a side edge 8613 of the board 861 to abut the side edge 8613, thereby positioning the board 861 at the side edge 8613.

In some embodiments, the height of the first strip rib 332 protruding on the inner surface of the main sidewall 1433 may be greater than, less than, or equal to the thickness of the auxiliary piece 86, as long as the first strip rib 332 can form the glue groove 87 together with the auxiliary piece 86 and position the board 861 of the auxiliary piece 86, which is not specifically limited herein.

In some embodiments, a positioning hole 8614 may be set on the board 861. The positioning hole 8641 may pass through a motherboard surface of the board 861. A positioning column 333 corresponding to the positioning hole 8614 may be integrally formed on the inner surface of the main sidewall 1433. After the auxiliary piece 86 being set on the inner surface of the main sidewall 1433, the positioning column 333 may be inserted into the positioning hole 8614, thereby further positioning the auxiliary piece 86. The numbers (counts) of the positioning holes 8614 and the positioning columns 333 may be the same. In some embodiments, the numbers of the positioning holes 8614 and the positioning columns 333 may both be two.

In an application scenario, at least two lugs 8615 may be formed on the side edge 8613 of the board 861, and two positioning holes 8614 may be respectively disposed on the corresponding lugs 8615. A second strip rib 334 may be integrally formed on the inner surface of the main sidewall 1433. The second strip rib 334 may be extended in a direction toward the auxiliary sidewall 1434, and be perpendicular to an extending direction of the positioning arm 3322 of the first strip rib 332. A positioning groove 8616 with a strip shape corresponding to the second strip rib 334 may be set on the board 861. The positioning groove 8616 may be recessed in a direction away from the main sidewall 1433. One end of the positioning groove 8616 may be connected to the side edge 8613 of the board 861 and be perpendicular to the side edge 8613.

In an application scenario, the positioning groove 8616 may be formed only by a recessed surface of the board 861 that is conformed to the main sidewall 1433. The depth of the positioning groove 8616 may be less than the thickness of the board 861. At this time, the surface of the board 861 opposite to the recessed surface may not be affected by the positioning groove 8616. In another application scenario, the depth of the positioning groove 8616 may be greater than the depth of the board 861, such that when a surface of the board 861 near the main sidewall 1433 is recessed, the other opposite surface protrudes toward the recessed direction, thereby cooperating to form the positioning groove 8616. After the auxiliary piece 86 being set on the inner surface of the main sidewall 1433, the second strip rib 334 may be embedded in the strip positioning groove 8616 with strip shape to further position the board 861.

In connection with FIG. 14, FIG. 17 and FIG. 18, in some embodiments, an exposed hole 14175 corresponding to the conductive column 85 may be set on the housing casing 1417. After the housing casing 1417 being covered around the periphery of the circuit housing 1430, an end of the conductive column 85 located outside the circuit housing 1430 may further be exposed through the exposed hole 14175 to be further connected to external circuits of the speaker 1400, such that the speaker 1400 may be charged or transmit data through the conductive column 85.

In some embodiments, the outer surface of the circuit housing 1430 may be recessed with a glue groove 39 surrounding a plurality of mounting holes 331. Specifically, the shape of the glue groove 39 may be an oval ring, and the plurality of mounting holes 331 may be respectively set on the circuit housing 1430 surrounded by the groove 39. A sealant may be applied on the glue groove 39. After the housing casing 1417 and the circuit housing 1430 being assembled, the housing casing 1417 may be in sealed connection with the circuit housing 1430 through the sealant at the peripheries of the mounting holes 331, such that when external liquid enters the inside of the housing casing 1417 through the exposed hole 14175, the housing casing 1417 may slide around the periphery of the circuit housing 1430. In addition, the mounting hole 331 may be further sealed from the outside of the circuit housing 1430 to further improve the sealing performance of the circuit housing 1430, thereby improving the waterproof performance of the speaker 1400.

It should be noted that the above description of the speaker 1400 is merely for illustration purposes, and not intended to limit the scope of the present disclosure. For those skilled in the art, various changes and modifications may be made according to the description of the present disclosure. However, the changes and modifications may not depart from the spirit of the present disclosure. For example, the number (or count) of the first recessed areas 341 may be one or more, and one or more button holes 342 may be set on each of the first recessed areas 341, which is not limited herein. All such modifications are within the scope of the present disclosure.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A speaker, comprising:

a housing;

a transducer residing inside the housing and configured to generate vibrations, the vibrations producing a sound wave inside the housing and causing a leaked sound wave spreading outside the housing from a portion of the housing;

at least one sound guiding hole located on the housing and configured to guide the sound wave inside the housing through the at least one sound guiding hole to an outside of the housing, the guided sound wave having a phase different from a phase of the leaked sound wave, the guided sound wave interfering with the leaked sound wave in a target region, wherein a frequency of a guided sound wave output from the at least one sound guiding hole relates to a distance between the at least one sound guiding hole and the portion of the housing, the at least one sound guiding hole includes at least one first hole and at least one second hole on the housing, the at least one first hole being configured to output first guided sound wave through the at least one first hole, the at least one second hole being configured to output second guided sound wave through the at least one second hole, a first distance between the at least one first hole and the portion of the housing being greater than a second distance between the at least one first hole and the portion of the housing, and a frequency of the first guided sound wave from the at least one first hole is smaller than a frequency of the second guided sound wave from the at least one second hole;

a button set on a button hole on the housing;

an elastic pad set between the button and the button hole; and a rigid pad disposed between the elastic pad and the housing.

2. The speaker of claim 1, wherein a first recessed area is set on the housing, and the button hole is set in the first recessed area.

3. The speaker of claim 2, wherein the elastic pad is set on the first recessed area, and a second recessed area corresponding to the button hole is set on the elastic pad, the second recessed area extending to inside of the button hole.

4. The speaker of claim 3, wherein a through hole is set on the rigid pad and the second recessed area of the elastic pad extends to the inside of the button hole through the through hole.

5. The speaker of claim 3, wherein the button includes a button body and a button contact point, wherein the button body is disposed on a side of the elastic pad away from the housing and the button contact point extends to inside of the second recessed area.

6. The speaker of claim 5, wherein the button includes at least two button single bodies disposed away from each other and a connecting portion connected to the at least two button single bodies.

7. The speaker of claim 6, wherein the button contact point is set on each of the at least two button single bodies and an elastic bump for supporting the connecting portion is set on the elastic pad.

8. The speaker of claim 5, further comprising a button circuit board disposed inside the housing, and a button switch corresponding to the button hole is set on the button circuit, wherein when the button is pressed, the button contact point contacts and triggers the button switch.

9. The speaker of claim 1, wherein the elastic pad and the rigid pad abut each other.

10. The speaker of claim 1, wherein the elastic pad covers an outside of the button hole, and prevents the button from moving relative to the button hole.

11. The speaker of claim 1, wherein the housing includes an accommodating body and a cover, wherein a cavity that has an opening at one end of the accommodating body is set on the accommodating body and the cover is covered on the opening of the cavity to seal the cavity.

12. The speaker of claim 1, wherein the at least one sound guiding hole includes a damping layer, the damping layer being configured to adjust the phase of the guided sound wave in the target region.

13. The speaker of claim 1, wherein the guided sound wave includes at least two sound waves having different phases.

14. The speaker of claim 1, wherein the at least one sound guiding hole includes two sound guiding holes located on the housing.

15. The speaker of claim 14, wherein the two sound guiding holes are arranged to generate at least two sound waves having different phases to reduce a sound pressure level of the leaked sound wave having different wavelengths.

16. The speaker of claim 15, wherein at least a portion of the leaked sound wave whose sound pressure level is reduced is within a range of 1500 Hz to 3000 Hz.

17. The speaker of claim 1, wherein the first guided sound wave and the second guided sound wave are transmitted to their corresponding sound guiding holes via different acoustic routes.

18. The speaker of claim 17, wherein at least one of the different acoustic routes includes at least one of a lumen structure or a resonance cavity.

* * * * *